US012487883B2

(12) United States Patent
He et al.

(10) Patent No.: US 12,487,883 B2
(45) Date of Patent: Dec. 2, 2025

(54) CRITICAL DATA MANAGEMENT WITHIN A MEMORY SYSTEM

(71) Applicant: Micron Technology, Inc., Boise, ID (US)

(72) Inventors: Deping He, Boise, ID (US); Caixia Yang, Boise, ID (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 18/443,011

(22) Filed: Feb. 15, 2024

(65) Prior Publication Data

US 2024/0281324 A1  Aug. 22, 2024

Related U.S. Application Data

(60) Provisional application No. 63/486,387, filed on Feb. 22, 2023.

(51) Int. Cl.
*G06F 11/00* (2006.01)
*G06F 11/07* (2006.01)
*G06F 11/10* (2006.01)

(52) U.S. Cl.
CPC ........ *G06F 11/1064* (2013.01); *G06F 11/076* (2013.01); *G06F 11/1016* (2013.01)

(58) Field of Classification Search
None
See application file for complete search history.

(56) References Cited

U.S. PATENT DOCUMENTS

| | | | | |
|---|---|---|---|---|
| 8,724,392 | B1* | 5/2014 | Asnaashari | G06F 3/0689 365/158 |
| 8,929,146 | B1* | 1/2015 | Asnaashari | G06F 12/0238 365/158 |
| 10,452,471 | B2* | 10/2019 | Shen | G11C 16/10 |
| 10,884,628 | B2* | 1/2021 | Yang | G06F 12/0246 |
| 2006/0026312 | A1* | 2/2006 | Chauvel | G06F 9/45504 712/228 |
| 2015/0026392 | A1* | 1/2015 | Asnaashari | G06F 3/0643 711/103 |
| 2015/0364162 | A1* | 12/2015 | D'Abreu | G11C 7/1075 711/149 |
| 2019/0279704 | A1* | 9/2019 | Derner | G06F 3/0679 |
| 2020/0142472 | A1* | 5/2020 | Golov | G06F 9/4418 |

* cited by examiner

*Primary Examiner* — Mujtaba M Chaudry
(74) *Attorney, Agent, or Firm* — Holland & Hart LLP

(57) ABSTRACT

Methods, systems, and devices for critical data management within a memory system are described. A memory system may avoid writing critical data to weak word lines. For example, as part of a media management operation or a host write operation (among other examples), the memory system may determine which data is critical data and may determine which word lines are weak word lines, which may refer to word lines having bit error rates that satisfy a threshold. The memory system may refrain from writing critical data to memory cells coupled with weak word lines, and may instead write non-critical or dummy data to the weak word lines. The memory system may reserve the writing of critical data to memory cells coupled with non-weak word lines, which may refer to word lines having bit error rates that fail to satisfy the threshold.

20 Claims, 9 Drawing Sheets

CRITICAL DATA MANAGEMENT WITHIN A MEMORY SYSTEM

CROSS REFERENCE

The present application for patent claims the benefit of U.S. Provisional Patent Application No. 63/486,387 by H E et al., entitled "CRITICAL DATA MANAGEMENT WITHIN A MEMORY SYSTEM," filed Feb. 22, 2023, assigned to the assignee hereof, and expressly incorporated by reference herein.

TECHNICAL FIELD

The following relates to one or more systems for memory, including critical data management within a memory system.

BACKGROUND

Memory devices are widely used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, the memory device may read (e.g., sense, detect, retrieve, determine) states from the memory cells. To store information, the memory device may write (e.g., program, set, assign) states to the memory cells.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

DETAILED DESCRIPTION

Figure 1:
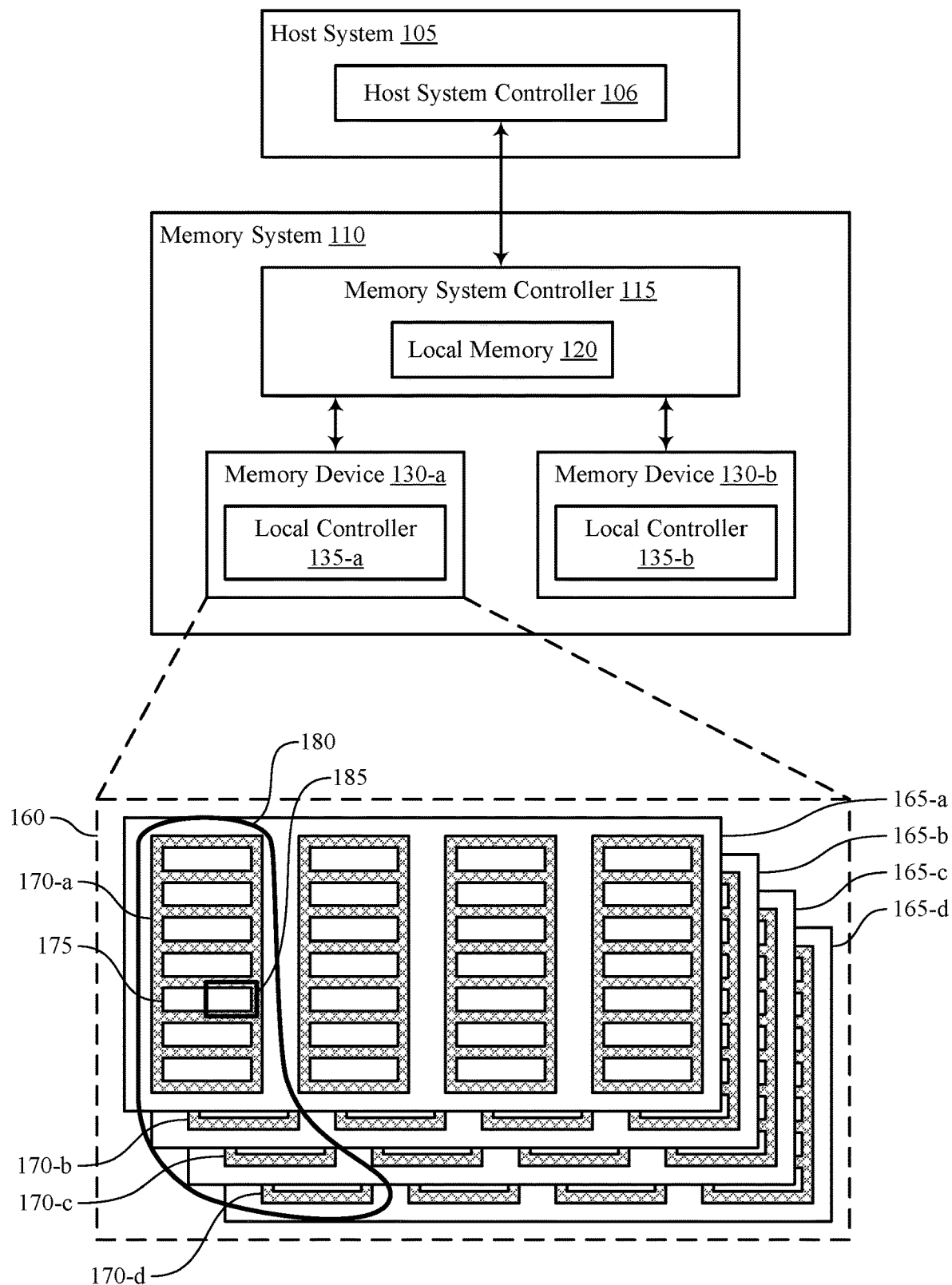
FIG. 1 illustrates an example of a system that supports critical data management within a memory system in accordance with examples as disclosed herein.

A memory system may include access circuitry, such as word lines and bit lines (among other examples), via which the memory system may access memory cells of the memory system. In some cases, the memory system may include word lines that are associated with higher bit error rates compared to other word lines, which may be referred to as weak word lines. For example, a weak word line (e.g., a word line with a bit error rate that satisfies a threshold) may exist due to, for example, manufacturing defects that may result in reduced current through the word line relative to other similar word lines. In some cases, a memory system may perform error recovery operations that may increase the reliability of reading data stored in memory cells coupled with weak word lines. However, such error recovery operations may increase a latency associated with reading the data, which may increase a risk that some latency sensitive operations of the memory system fail, among other issues.

For example, the memory system may store both critical data and non-critical data, and in some cases, reading critical data may be latency sensitive. In some cases, if the critical data is stored to memory cells coupled with weak word lines, the added latency associated with performing the error recovery operations using the weak word lines may result in the failure of operations associated with the critical data, such as a host system bootup failure due to timeout. Additionally, as the quantity of levels in a memory system increases, such as a three-dimensional (3D) memory system increases, the quantity of weak word lines may also increase. An increased quantity of weak word lines may increase the likelihood that critical data is written to memory cells coupled with a weak word line, which may increase the likelihood of latency-sensitive operation failure, such as timeout related failures, among other issues.

In accordance with examples described herein, the memory system may avoid writing critical data to memory cells associated with (e.g., coupled with) weak word lines as part of one or more operations, such as a media management operation, a host write operation, or both, to reduce or eliminate the writing of critical data to memory cells associated with (e.g., coupled with) weak word lines. For example, as part of media management operations, the memory system may determine which data is critical data (e.g., which logical block addresses (LBAs) are associated with critical data) and may determine which word lines are weak word lines. As part of transferring data to a data block, the memory system may refrain from writing critical data to memory cells coupled with weak word lines and may instead write non-critical data or dummy data to the weak word lines, reserving the writing of critical data to memory cells coupled with non-weak (e.g., strong) word lines. Additionally or alternatively, the memory system may avoid initially writing data (e.g., as part of a host write) to memory cells coupled with weak word lines. Instead, the memory system may write non-critical data (e.g., dummy data, garbage collection data, or other non-critical data) to the memory cells coupled weak word lines. By avoiding writing critical data to weak word lines, the memory system may decrease a latency associated with reading critical data and increase reliability of the system by reducing the likelihood critical data related operation failure (e.g., host system bootup failure due to timeout, among other operations involving critical data), among other advantages.

Figure 2:
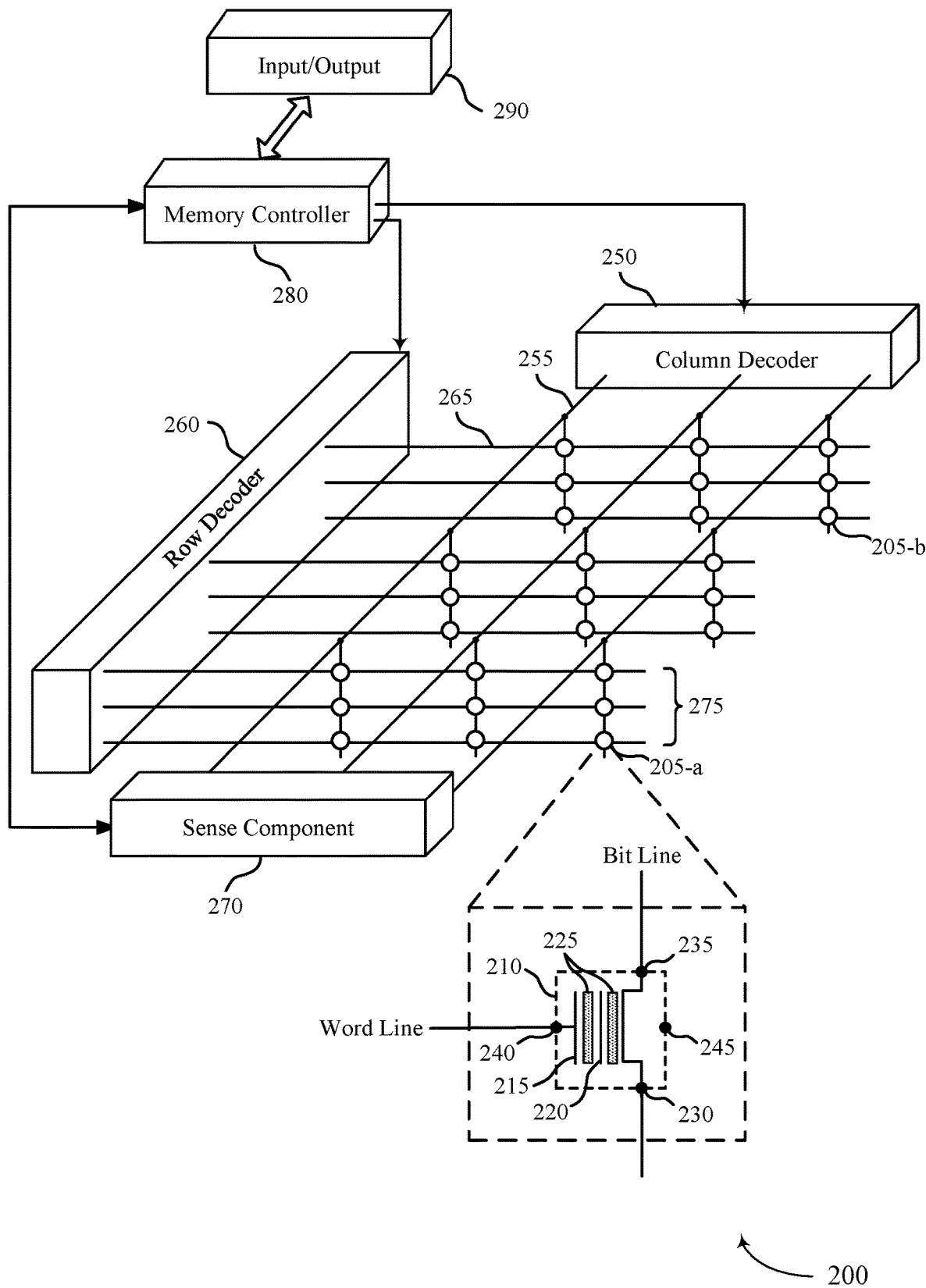
FIG. 2 illustrates an example of a memory architecture that supports critical data management within a memory system in accordance with examples as disclosed herein.

Features of the disclosure are initially described in the context of systems, devices, and circuits with reference to FIGS. 1 through 2. Features of the disclosure are described in the context of data transfer diagrams and a system with reference to FIGS. 3 through 6. These and other features of the disclosure are further illustrated by and described in the context of an apparatus diagram and flowchart that relate to critical data management within a memory system with reference to FIGS. 7 through 9.

FIG. 1 illustrates an example of a system 100 that supports critical data management within a memory system in accordance with examples as disclosed herein. The system 100 includes a host system 105 coupled with a memory system 110. The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other devices.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-*a* and 130-*b* are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, a virtual block 180 may include virtual pages. For example, the pages 175 may include at least a first quantity of storage (e.g., 16 kilobyte (kB), among other quantities of storage). A virtual page may correspond to a data granularity associated with the type of memory system (e.g., a logical granularity at which data may be written, read, or both). For example, the virtual page may correspond to a second quantity of storage (e.g., 4 kB for UFS and 512 B for eMMC) from which data may be logically read or to which data may be logically written. In some examples, the virtual pages may be referred to as translation units 185 (e.g., data units) and may represent a minimal amount of data pointed to by entries of a flash translation layer (FTL) table. In some cases, logical translation units (e.g., logical addresses of the translation units 185) may be used to indicate data at a logical level (e.g., at a host and controller level), and the translation units 185 may be the physical locations at which the logical data is stored.

In some cases, planes 165 may refer to groups of blocks 170 and, in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-*a*, 170-*b*, 170-*c*, and 170-*d* that are within planes 165-*a*, 165-*b*, 165-*c*, and 165-*d*, respectively, and blocks 170-*a*, 170-*b*, 170-*c*, and 170-*d* may be collectively referred to as a virtual block 180. In some cases, a virtual block may include blocks 170 from different memory devices 130 (e.g., including blocks in one or more planes of memory device 130-*a* and memory device 130-*b*). In some cases, the blocks 170 within a virtual block may have the same block address within their respective planes 165 (e.g., block 170-*a* may be "block 0" of plane 165-*a*, block 170-*b* may be "block 0" of plane 165-*b*, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at a page level of granularity, or portion thereof) but may be erased at a second level of granularity (e.g., at a block level of granularity). That is, a page 175 may be the smallest unit of memory (e.g., set of memory cells) that may be independently programmed or read (e.g., programmed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, no data, or a combination thereof. For example, a page 175 may include a subset of valid translation units 185, a subset of invalid translation units 185, a subset of empty translation units 185, or a combination thereof. Invalid data may be data that is outdated, which may be due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

The system 100 may include any quantity of non-transitory computer readable media that support critical data management within a memory system. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

The memory system 110 may include weak word lines having bit error rates that satisfy (e.g., are greater than, are greater than or equal to) a threshold. In some cases, the memory system 110 may perform advanced error recovery operations that may increase the reliability of reading data stored in memory cells coupled with weak word lines. However, such error recovery operations may increase latency associated with reading the data, which may increase a risk that some latency sensitive operations of the memory system fail. For example, the memory system 110 may store both critical and non-critical data, and in some cases, reading critical data may be latency sensitive. In some cases, if the critical data is stored to memory cells coupled with weak word lines, the added latency associated with the advanced error recovery operations may result in the failure of operations associated with the critical data, such as host system 105 bootup failure due to timeout.

In accordance with examples described herein, the memory system 110 may avoid writing critical data to memory cells coupled with weak word lines as part of a media management operation, a host write operation, or both, to reduce or eliminate the writing of critical data to memory cells coupled with weak word lines. For example, as part of media management operations, the memory system 110 may determine which data is critical data (e.g., which LBAs are associated with critical data) and may determine which word lines are weak word lines. As part of transferring data to a data block (e.g., a block 170, a virtual block 180), the memory system 110 may refrain from writing critical data to memory cells coupled with weak word lines and may instead write non-critical data or dummy data to the weak word lines, reserving the writing of critical data to memory cells coupled with non-weak (e.g., strong) word lines. Additionally or alternatively, the memory system 110 may avoid initially writing data (e.g., as part of a host write) to memory cells coupled with weak word lines. Instead, the memory system may write non-critical data (e.g., dummy data, garbage collection data, or other non-critical data) to the memory cells coupled weak word lines. By avoiding writing critical data to weak word lines, the memory system may decrease a latency associated with reading critical data and increase reliability of the system by reducing the likelihood critical data related operation failure (e.g., host system 105 bootup failure due to timeout, among other operations involving critical data).

FIG. 2 illustrates an example of a memory device 200 that supports critical data management within a memory system in accordance with examples as disclosed herein. FIG. 2 is an illustrative representation of various components and features of the memory device 200, which may be an example of aspects of the memory system 110, as described with reference to FIG. 1, such as portions of a memory system controller 115, a memory device 130, or a combination thereof. As such, the components and features of the memory device 200 are shown to illustrate functional interrelationships, and not necessarily physical positions within the memory device 200. Further, although some elements included in FIG. 2 are labeled with a numeric indicator, some other corresponding elements are not labeled, even though they are the same or would be understood to be similar, in an effort to increase visibility and clarity of the depicted features.

The memory device 200 may include one or more memory cells 205, such as memory cell 205-a and memory cell 205-b. In some examples, a memory cell 205 may be a NAND memory cell, such as in the blow-up diagram of memory cell 205-a. Each memory cell 205 may be programmed to store a logic value representing one or more bits of information (e.g., SLCs, MLCs, TLCs, QLCs). In some cases, a multiple-level memory cell 205 (e.g., an MLC memory cell, a TLC memory cell, a QLC memory cell) may be physically different than an SLC cell. For example, a multiple-level memory cell 205 may use a different cell geometry or may be fabricated using different materials. In some examples, a multiple-level memory cell 205 may be physically the same or similar to an SLC cell, and other circuitry in a memory block (e.g., a controller, sense amplifiers, drivers) may be configured to operate (e.g., read and program) the memory cell as an SLC cell, or as an MLC cell, or as a TLC cell, etc.

In some NAND memory arrays, each memory cell 205 may be illustrated as a transistor that includes a charge trapping structure (e.g., a floating gate, a replacement gate, a dielectric material) for storing an amount of charge representative of a logic value. For example, the blow-up in FIG. 2 illustrates a NAND memory cell 205-a that includes a transistor 210 (e.g., a metal-oxide-semiconductor (MOS) transistor) that may be used to store a logic value. The transistor 210 may include a control gate 215 and a charge trapping structure 220 (e.g., a floating gate, a replacement gate), where the charge trapping structure 220 may, in some examples, be between two portions of dielectric material 225. The transistor 210 also may include a first node 230 (e.g., a source or drain) and a second node 235 (e.g., a drain or source). A logic value may be stored in transistor 210 by storing (e.g., writing) a quantity of electrons (e.g., an amount of charge) on the charge trapping structure 220. An amount of charge to be stored on the charge trapping structure 220 may depend on the logic value to be stored. The charge stored on the charge trapping structure 220 may affect the threshold voltage of the transistor 210, thereby affecting the amount of current that flows through the transistor 210 when the transistor 210 is activated (e.g., when a voltage is applied to the control gate 215, when the memory cell 205-a is read). In some examples, the charge trapping structure 220 may be an example of a floating gate or a replacement gate that may be part of a 2D NAND structure. For example, a 2D NAND array may include multiple control gates 215 and charge trapping structures 220 arranged around a single channel (e.g., a horizontal channel, a vertical channel, a columnar channel, a pillar channel).

A logic value stored in the transistor 210 may be sensed (e.g., as part of a read operation) by applying a voltage to the control gate 215 (e.g., to control node 240, via a word line 265) to activate the transistor 210 and measuring (e.g., detecting, sensing) an amount of current that flows through the first node 230 or the second node 235 (e.g., via a bit line 255). For example, a sense component 270 may determine whether an SLC memory cell 205 stores a logic 0 or a logic 1 in a binary manner (e.g., based on a presence or absence of a current through the memory cell 205 when a read voltage is applied to the control gate 215, based on whether the current is above or below a threshold current). For a multiple-level memory cell 205, a sense component 270 may determine a logic value stored in the memory cell 205 based on various intermediate threshold levels of current when a read voltage is applied to the control gate 215, or by applying different read voltages to the control gate and evaluating different resulting levels of current through the transistor 210, or various combinations thereof. In one example of a multiple-level architecture, a sense component 270 may determine the logic value of a TLC memory cell 205 based on eight different levels of current, or ranges of current, that define the eight potential logic values that could be stored by the TLC memory cell 205.

An SLC memory cell 205 may be written by applying one of two voltages (e.g., a voltage above a threshold or a voltage below a threshold) to the memory cell 205 to store, or not store, an electric charge on the charge trapping structure 220 and thereby cause the memory cell 205 to store one of two possible logic values. For example, when a first voltage is applied to the control node 240 (e.g., via a word line 265) relative to a bulk node 245 (e.g., a body node) for the transistor 210 (e.g., when the control node 240 is at a higher voltage than the bulk), electrons may tunnel into the charge trapping structure 220. Injection of electrons into the charge trapping structure 220 may be referred to as programming the memory cell 205 and may occur as part of a write operation. A programmed memory cell may, in some cases, be considered as storing a logic 0. When a second voltage is applied to the control node 240 (e.g., via the word line 265) relative to the bulk node 245 for the transistor 210 (e.g., when the control node 240 is at a lower voltage than the bulk node 245), electrons may leave the charge trapping structure 220. Removal of electrons from the charge trapping structure 220 may be referred to as erasing the memory cell 205 and may occur as part of an erase operation. An erased memory cell may, in some cases, be considered as storing a logic 1. In some cases, memory cells 205 may be programmed at a page level of granularity due to memory cells 205 of a page sharing a common word line 265, and memory cells 205 may be erased at a block level of granularity due to memory cells 205 of a block sharing commonly biased bulk nodes 245.

In contrast to writing an SLC memory cell 205, writing a multiple-level (e.g., MLC, TLC, or QLC) memory cell 205 may involve applying different voltages to the memory cell 205 (e.g., to the control node 240 or bulk node 245 thereof) at a finer level of granularity to more finely control the amount of charge stored on the charge trapping structure 220, thereby enabling a larger set of logic values to be represented. Thus, multiple-level memory cells 205 may provide greater density of storage relative to SLC memory cells 205 but may, in some cases, involve narrower read or write margins or greater complexities for supporting circuitry.

A charge-trapping NAND memory cell 205 may operate similarly to a floating-gate NAND memory cell 205 but, instead of or in addition to storing a charge on a charge trapping structure 220, a charge-trapping NAND memory cell 205 may store a charge representing a logic state in a dielectric material between the control gate 215 and a channel (e.g., a channel between a first node 230 and a second node 235). Thus, a charge-trapping NAND memory cell 205 may include a charge trapping structure 220, or may implement charge trapping functionality in one or more portions of dielectric material 225, among other configurations.

In some examples, each page of memory cells 205 may be connected to a corresponding word line 265, and each column of memory cells 205 may be connected to a corresponding bit line 255 (e.g., digit line). Thus, one memory cell 205 may be located at the intersection of a word line 265 and a bit line 255. This intersection may be referred to as an address of a memory cell 205. In some cases, word lines 265 and bit lines 255 may be substantially perpendicular to one another, and may be generically referred to as access lines or select lines.

In some cases, a memory device 200 may include a 3D memory array, where multiple 2D memory arrays may be formed on top of one another. In some examples, such an arrangement may increase the quantity of memory cells 205 that may be fabricated on a single die or substrate as compared with 1D arrays, which, in turn, may reduce production costs, or increase the performance of the memory array, or both. In the example of FIG. 2, memory device 200 includes multiple levels (e.g., decks, layers, planes, tiers) of memory cells 205. The levels may, in some examples, be separated by an electrically insulating material. Each level may be aligned or positioned so that memory cells 205 may be aligned (e.g., exactly aligned, overlapping, or approximately aligned) with one another across each level, forming a memory cell stack 275. In some cases, memory cells aligned along a memory cell stack 275 may be referred to as a string of memory cells 205.

Accessing memory cells 205 may be controlled through a row decoder 260 and a column decoder 250. For example, the row decoder 260 may receive a row address from the memory controller 280 and activate an appropriate word line 265 based on the received row address. Similarly, the column decoder 250 may receive a column address from the memory controller 280 and activate an appropriate bit line 255. Thus, by activating one word line 265 and one bit line 255, one memory cell 205 may be accessed. As part of such accessing, a memory cell 205 may be read (e.g., sensed) by sense component 270. For example, the sense component 270 may be configured to determine the stored logic value of a memory cell 205 based on a signal generated by accessing the memory cell 205. The signal may include a current, a voltage, or both a current and a voltage on the bit line 255 for the memory cell 205 and may depend on the logic value stored by the memory cell 205. The sense component 270 may include various circuitry (e.g., transistors, amplifiers) configured to detect and amplify a signal (e.g., a current or voltage) on a bit line 255. The logic value of memory cell 205 as detected by the sense component 270 may be output via input/output component 290. In some cases, a sense component 270 may be a part of a column decoder 250 or a row decoder 260, or a sense component 270 may otherwise be connected to or in electronic communication with a column decoder 250 or a row decoder 260.

A memory cell 205 may be programmed or written by activating the relevant word line 265 and bit line 255 to enable a logic value (e.g., representing one or more bits of information) to be stored in the memory cell 205. A column decoder 250 or a row decoder 260 may accept data (e.g., from the input/output component 290) to be written to the memory cells 205. In the case of NAND memory, a memory cell 205 may be written by storing electrons in a charge trapping structure or an insulating layer.

A memory controller 280 may control the operation (e.g., read, write, re-write, refresh) of memory cells 205 through the various components (e.g., row decoder 260, column decoder 250, sense component 270). In some cases, one or more of a row decoder 260, a column decoder 250, and a sense component 270 may be co-located with a memory controller 280. A memory controller 280 may generate row and column address signals in order to activate a desired word line 265 and bit line 255. In some examples, a memory controller 280 may generate and control various voltages or currents used during the operation of memory device 200.

The memory device 200 may include weak word lines 265 and non-weak word lines 265 (e.g., strong word lines). For example, a weak word line 265 may be a word line 265 having a bit error rate that satisfies (e.g., is greater than, is greater than or equal to) a threshold, while a non-weak word line may be a word line 265 having a bit error rate that fails to satisfy (e.g., is less than, is less than or equal to) the threshold. The memory device 200 may perform error recovery operations that may increase the reliability of reading data stored in memory cells 205 coupled with weak word lines 265. However, such error recovery operations may increase latency associated with reading the data. If reading critical data, the added latency associated with the error recovery operations may cause issues with operation of the memory system, such as host system bootup failure due to timeout. Additionally, as the quantity of levels in a 3D memory array of the memory device 200 increases, the quantity of weak word lines 265 may also increase. An increased quantity of weak word lines 265 may increase the likelihood that critical data is written to memory cells 205 coupled with a weak word line 265, which may increase the likelihood of latency-sensitive operation failure, such as timeout related failures, among other issues.

In accordance with examples described herein, the memory device 200 may avoid writing critical data to memory cells 205 coupled with weak word lines 265 as part of a media management operation, a host write operation, or both, to reduce or eliminate the writing of critical data to memory cells 205 coupled with weak word lines 265. For example, as part of media management operations, the memory device 200 may determine which data is critical data (e.g., which LBAs are associated with critical data) and refrain from writing critical data to memory cells 205 coupled with weak word lines 265. Instead, the memory device 200 may write non-critical data or dummy data to the weak word lines 265, reserving the writing of critical data to memory cells 205 coupled with non-weak word lines. In some cases, the memory device 200 may avoid initially writing data (e.g., as part of a host write) to memory cells 205 coupled with weak word lines 265 and may instead write non-critical data (e.g., dummy data, garbage collection data, or other data) to the memory cells 205 coupled weak word lines 265.

Figure 3:
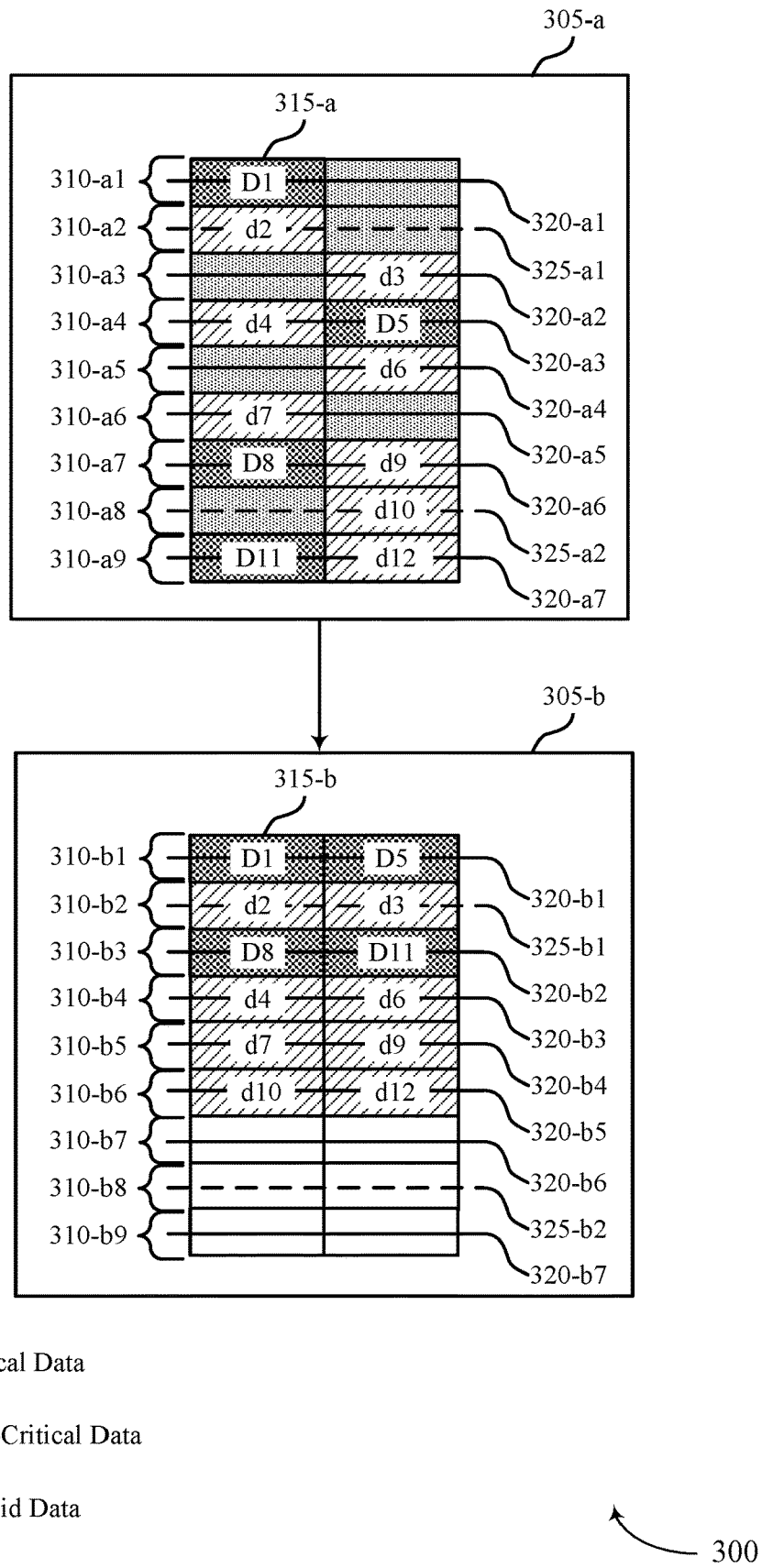
FIGS. 3, 4, and 5 illustrate examples of data transfer diagrams that support critical data management within a memory system in accordance with examples as disclosed herein.

FIG. 3 illustrates an example of a data transfer diagram 300 that supports critical data management within a memory system in accordance with examples as disclosed herein. The data transfer diagram 300 may be implemented by aspects of the system 100 and the memory device 200 described with reference to FIGS. 1 and 2, respectively. For example, the data transfer diagram 300 may be implemented by a memory system or aspects thereof, such as a memory system 110 or a memory device 200 described with reference to FIGS. 1 and 2.

The data transfer diagram 300 may include blocks 305, which may be examples of a block 170 or a virtual block 180 described with reference to FIG. 1. In some cases, the memory system may perform media management operations (e.g., garbage collection, wear leveling, folding, among others) in which data is transferred from a source block 305-a to a destination block 305-b. For example, as part of a garbage collection operation, the memory system may move (e.g., transfer) valid data (e.g., critical and non-critical data) from pages 310-a of the source block 305-a to pages 310-b of the destination block 305-b. The memory system may then erase the source block 305-a to free the source block 305-a to store other data. As part of a wear leveling operation, the memory system may select block 305-b as a destination block for data, for example, based on respective quantities of total access operations performed the blocks 305 of the memory system in order to create a relatively even distribution of wear between the blocks 305. In another example, the memory system may transfer data from the source block 305-a to the destination block 305-b as part of a folding operation. For example, a folding operation may include moving data from block 305-a which may include memory cells, such as SLCs, MLCs, TLCs, or QLCs, to block 305-b, which may include higher storage density memory cells, such as QLCs. In some cases, writing data to lower storage density memory cells (e.g., SLCs, MLCs, TLCs) may be more time efficient (e.g., associated with a reduced latency), while storing data in higher storage density memory cells (e.g., QLCs) may be more storage efficient. Thus, in some examples, the memory system may initially write data to block 305-a (e.g., based on a host write, for example, if including lower storage density memory cells) and then later transfer the data to block 305-b for more efficient storage as part of a folding operation.

Each block 305 may include pages 310 (e.g., pages 175). In some cases, a page 310 may include one or more (e.g., two) translation units 315 (e.g., translation units 315-a of pages 310-a and translation units 315-b of pages 310-b), which may be examples of translation units 185 described with reference to FIG. 1. Each page 310 may contain memory cells (e.g., memory cells 205) coupled with a word line 320 or a weak word line 325 (e.g., a word line 320 with a bit error rate that satisfies a threshold) that the memory system may use to perform access operations on the memory cells of the page 310. For example, the block 305-a may include pages 310-a1 through 310-a9 that are each coupled with a respective word line, and the block 305-b may include pages 310-b1 through 310-b9 that are each coupled with a respective word line (although other quantities of page 310 and word lines in a block 305 are possible). In the example of FIG. 3, the pages 310-a1, 310-a3 through 310-a7, and 310-a9 (e.g., the memory cells of these pages 310) may be coupled with word lines 320-a1 through 320-a7, respectively, and the pages 310-a2 and 310-a8 may be coupled with weak word lines 325-a1 and 325-a2, respectively. Additionally, the pages 310-b1, 310-b3 through 310-b7, and 310-b9 (e.g., the memory cells of these pages 310) may be coupled with word lines 320-b1 through 320-b7, respectively, and the pages 310-b2 and 310-b8 may be coupled with weak word lines 325-b1 and 325-b2, respectively.

In some cases, a weak word line 325 may exist due to manufacturing defects that may result in reduced current through the weak word line 325 compared to a word line 320. The reduced current may result in higher bit error rates associated with accessing the memory cells coupled with the weak word line 325. In some cases, the memory system may perform one or more error recovery operations that enable the memory system to more reliably access memory cells coupled with weak word lines 325. For example, the memory system may perform 4-bit corrective read operations, dynamic error correction code (ECC) operations, dynamic exclusive or (XOR) operations, or any combination thereof, among other error recovery operations, to increase a reliability of accessing the memory cells. In some examples, performing the one or more error recovery operations may include multiple read operations, which may increase latency associated with reading data from memory cells coupled with the weak word lines 325.

The memory system may store various types of data, such as critical and non-critical data. For example, critical data may be a first type of data associated with a host system (e.g., a host system 105) and non-critical data may be a second type of data associated with the host system (e.g., or the memory system). For example, critical data may include system image data associated with the host system, operating system (OS) data associated with the host system, data associated with a bootup procedure of the host system, or any combination thereof, among other types of critical data. Non-critical data may include other types of data written to the memory system by the host system that are not critical to the operation of the host system, such as photo data, video data, user data (e.g., hot user data), parity data, or L2P data, among other types of data that may not be critical to the operation of the host system. In some cases, a quantity of critical data stored in the memory system may be less than a quantity of non-critical data stored in the memory system.

In some cases, reading critical data may be latency sensitive. For example, reading critical data associated with a bootup procedure (e.g., such as system image data, bootup data) of the host system may be at risk for system bootup timeout failure. As such, if critical data is stored in memory cells coupled with a weak word line 325, the increased latency associated with accessing the memory cells may lead to latency related failures and/or performance drops at the host system. In some cases, as the size of the memory system (e.g., as the quantity of levels of a 3D memory array of the memory system) increases, the quantity of total weak word lines 325 may also increase and a read window budget associated with reading the memory cells may decrease. As such, the probability of latency related delays or failures due to reading critical data stored in memory cells coupled with weak word lines 325 may increase.

Some critical data may be downloaded early in the memory system lifetime, and as part of media management operations (e.g., garbage collection, wear leveling, folding) the memory system may move critical data between blocks 305 of the memory system. To reduce the probability of latency related delays or failures associated with reading critical data, during (e.g., as part of) media management operations, the memory system may avoid writing critical data to memory cells coupled with weak word lines 325. For example, the memory system may determine which data is critical data and which data is non-critical data (e.g., any other type of data) and may determine which word lines are weak word lines 325. In the example of FIG. 3, as part of transferring data from the source block 305-a to the destination block 305-b, the memory system may refrain from writing critical data to the memory cells coupled with the weak word line 325-b1 and may instead write non-critical data to these memory cells.

The memory system may determine which data is critical and which data is non-critical (e.g., as part of a media management operation) according to various techniques. For example, the memory system may determine a set of logical addresses that is associated with critical data. In the example of FIG. 3, the memory system may determine that first data (e.g., data D1, D5, D8, and D11 stored at respective translation units of pages 310-a1, 310-a4, 310-a7, and 310-a9, respectively) is critical data according to the first data having logical addresses included in the set of logical addresses associated with critical data. In some cases, the memory system may determine which data is critical data (e.g., which logical addresses are included in the set of logical addresses) by tracking which logical addresses (e.g., LBAs) are associated with critical data. For example, the memory system may track which logical addresses (e.g., LBAs) are read as part of a bootup procedure (e.g., critical data) and determine that data written to the tracked logical addresses is critical data (e.g., the tracked logical addresses are the or are included in the set of logical addresses). In some examples, the memory system may determine that data associated with logical addresses excluded from the set of logical addresses is non-critical data.

In some cases, the memory system may read metadata associated with the data (e.g., included in a page 310-a that stores the data) indicating whether the data is critical data or non-critical data. In some cases, the memory system may receive, from the host system, an indication of whether given data is critical data or non-critical data. For example, the indication may be included in a command, from the host system, to write the data to the memory system. In some examples, the memory system may write the metadata indicating whether the data is critical data or non-critical data, for example, to a page 310-a to which the data is written (e.g., in conjunction with writing the data to the page 310-a). In some cases, data may be associated with stream identifiers that indicate a type of the data, such as hot data (e.g., data associated with a high probability of being overwritten, such as within a threshold time) or cold data (e.g., data associated with a low probability of being overwritten, such as within the threshold time), among other types of data. In some examples, the memory system may associate one or more of the stream identifiers as also being associated with critical data. For example, the memory system may determine that data indicated as cold data according to the stream identifier may be critical data and that data indicated as hot data according to the stream identifier may be non-critical data.

In some cases, the memory system may mark data as critical data as part of a media management operation before writing (e.g., transferring) the data to a destination block 305. For example, critical data (e.g., valid critical data) from the source block 305-a (e.g., D1, D5, D8, and D11) may be marked as critical data before the data is transferred to the destination block 305-b. The memory system may write critical data to non-weak (e.g., strong) word lines 320 based on the data being marked as critical data. In some examples, the memory system may read respective metadata written to the pages 310-a to determine whether respective data written to the pages 310-a (e.g., the translation units 315-a) is critical data or non-critical data. For example, the memory system may read metadata written to the page 310-a1 to determine that the data D1 is critical data, and so on. Similarly, the memory system may read metadata written to the page 310-a2 to determine that data d2 written to the page 310-a2 is non-critical data, and so on. Based on reading the metadata, the memory system may mark (e.g., store an indication, such as in the memory system controller 115) data of the source block 305-a as either critical data or non-critical data.

The memory system may initiate the media management operation to transfer first data (e.g., D1, D5, D8, and D11) of a first type (e.g., critical data) and second data (e.g., d2, d3, d4, d6, d7, d9, d10, and d12) of a second type (e.g., non-critical data) from the source block 305-a to the destination block 305-b. As part of the media management operation, and according to the first data being critical data, the memory system may write the first data to a first set of memory cells of the destination block 305-b coupled with a first set of word lines (e.g., word line 320-b1 and word line 320-b2) of the destination block 305-b. The first set of word lines 320-b may exclude word lines having a bit error rate that satisfies a threshold (e.g., weak word lines 325-b). According to the second data being non-critical data, the memory system may write the second data to a second set of memory cells coupled with a second set of word lines (e.g., word lines 320-b3, 320-b4, 320-b5, and weak word line 325-b1) of the destination block 305-b, where the second set of word lines includes one or more weak word lines (e.g., weak word line 325-b1).

In the example of FIG. 3, the memory system may write critical data to the destination block 305-b before writing non-critical data destination block 305-b. For example, the memory system may write critical data D1 and D5 to page 310-b1 of the destination block 305-b first (e.g., before writing non-critical data, such as the second data). In some cases, the memory system may write data to the pages 310-b of the destination block 305-b sequentially. That is, the memory system may first write data to the memory cells of the page 310-b1, then to the memory cells of the page 310-*b*2, and so on. As such, the word lines of the destination block 305-*b* may be arranged in an order according to which the data is sequentially written to the destination block 305-*b* (e.g., the word line 320-*b*1 coupled with the page 310-*b*1, the weak word line 325-*b*1 coupled with the page 310-*b*2, and so on). Here, the memory system may determine that weak word line 325-*b*1, which may be after the word line 320-*b*1 and before the other word lines 320-*b* in the order in the example of FIG. 3, has a bit error rate that satisfies the threshold.

To avoid writing critical data D8 and D11 to memory cells coupled with the weak word line 325-*b*1, the memory system may instead write non-critical data d2 and d3 to page 310-*b*2. That is, if a next sequential page 310-*b* to be written to as part of the media management operation is coupled with a weak word line 325-*b*, the memory system may refrain from writing critical data to the page 310-*b* and instead write non-critical data to the page 310-*b*. After writing the non-critical data to the page 310-*b* coupled with the weak word line 325-*b*, the memory system may resume writing critical data to the pages 310-*b* (e.g., if coupled with a non-weak word line 320-*b*). For example, the memory system may resume writing critical data D8 and D11 to page 310-*b*3 (e.g., due to the page 310-*b*3 being coupled with a non-weak word line 320-*b*) and write the remaining non-critical data d4, d6, d7, d9, d10, and d12 to pages 310-*b*4, 310-*b*5, and 310-*b*6 (e.g., after the memory system has finished writing the remaining critical data to the pages 310-*b*). By avoiding writing critical data to weak word lines 325-*b*, the memory system may avoid latency associated with error recovery operations if reading the critical data, thereby reducing a latency associated with reading the critical data and increasing reliability of the system, for example, by avoiding timeout failure while reading critical data, among other benefits.

Figure 4:
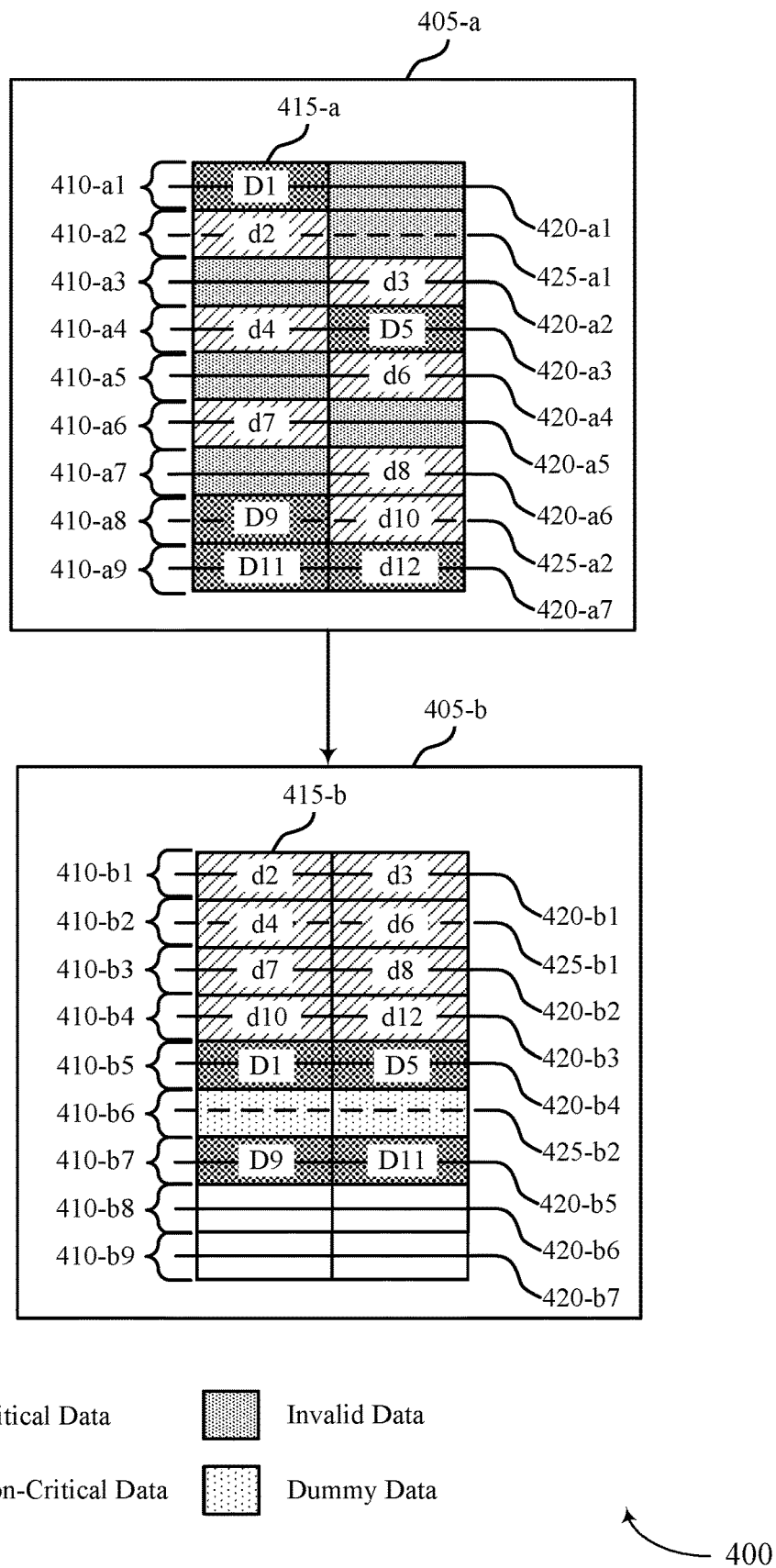

FIG. 4 illustrates an example of a data transfer diagram 400 that supports critical data management within a memory system in accordance with examples as disclosed herein. The data transfer diagram 400 may be implemented by aspects of the system 100 and the memory device 200 described with reference to FIGS. 1 and 2, respectively. For example, the data transfer diagram 400 may be implemented by a memory system or aspects thereof, such as a memory system 110 or a memory device 200 described with reference to FIGS. 1 and 2.

The data transfer diagram 400 may include a block 405-*a* and a block 405-*b*, which may be examples of a block 305-*a* and a block 305-*b*, respectively, as described with reference to FIG. 3. For example, the blocks 405 may include pages 410, translation units 415 (e.g., translation units 415-*a* of pages 410-*a* and translation units 415-*b* of pages 410-*b*), word lines 420, and weak word lines 425, which may be examples of the corresponding components described with reference to FIG. 3. In the example of FIG. 4, the block 405-*a* may include pages 410-*a*1 through 410-*a*9 that are each coupled with a respective word line, and the block 405-*b* may include pages 410-*b*1 through 410-*b*9 that are each coupled with a respective word line (although other quantities of page 410 and word lines in a block 405 are possible). In the example of FIG. 4, the pages 410-*a*1, 410-*a*3 through 410-*a*7, and 410-*a*9 (e.g., the memory cells of these pages 410) may be coupled with word lines 420-*a*1 through 420-*a*7, respectively, and the pages 410-*a*2 and 410-*a*8 may be coupled with weak word lines 425-*a*1 and 425-*a*2, respectively. Additionally, the pages 410-*b*1, 410-*b*3 through 410-*b*5, and 410-*b*7 through 410-*b*9 (e.g., the memory cells of these pages 410) may be coupled with word lines 420-*b*1 through 420-*b*7, respectively, and the pages 410-*b*2 and 410-*b*6 may be coupled with weak word lines 425-*b*1 and 425-*b*2, respectively.

As described with reference to FIG. 3, a media management operation may include the transfer of valid data from pages 410-*a* of a source block 405-*a* to pages 410-*b* of a destination block 405-*b*, and pages 410 may contain memory cells coupled with word lines 420 and weak word lines 425 (e.g., word lines 420 having a respective bit error rate that satisfies a threshold).

In example of FIG. 4, as part of a media management operation to transfer data from the source block 405-*a* to the destination block 405-*b*, the memory system may transfer non-critical data (e.g., data d2, d3, d4, d6, d7, d8, d10, and d12) before transferring critical data (e.g., data D1, D5, D9, and D11). For example, the memory system may read data (e.g., metadata) from pages 410-*a* of the source block 405-*a* and may determine which data to be transferred is critical data and which data is non-critical data. The memory system may determine whether data is critical or non-critical as described with reference to FIG. 3. The memory system may first write the non-critical data to page 410-*b*1 through page 410-*b*4, regardless of whether the corresponding word lines are weak or non-weak based on the data being non-critical. For example, the pages 410-*b*1 through 410-*b*4 may include memory cells coupled with non-weak word lines 420-*b*1 through 420-*b*3 and the weak word line 425-*b*1.

After writing the non-critical data to the destination block 405-*b*, the memory system may write the critical data to the destination block 405-*b* while avoiding writing critical data to weak word lines 425-*b*. For example, the memory system may write critical data D1 and D5 to page 410-*b*5. In some cases, the memory system may determine, as described with reference to FIG. 3, that the next page 410-*b*6 has memory cells coupled with the weak word line 425-*b*2 (e.g., because the weak word line 425-*b*2 has a bit error rate that satisfies the threshold). In such a case, when the memory system reaches the weak word line 425-*b*2 (e.g., after writing the critical data D1 and D5 to the page 410-*b*5), the memory system may refrain from writing critical data D9 and D11 to page 410-*b*6 to avoid the weak word line 425-*b*2 and may instead write dummy data to page 410-*b*6 (e.g., due having already written the non-critical data). After writing the dummy data to the page 410-*b*6, the memory system may continue writing the critical data, for example, by writing critical data D9 and D11 to page 410-*b*7 (e.g., based on the page 410-*b*7 being coupled with a non-weak word line 420-*b*). By writing the non-critical data first and avoiding remaining weak word lines 425-*b* by writing dummy data, the memory system may avoid critical data from being written to memory cells that are coupled with weak word lines 425.

Figure 5:
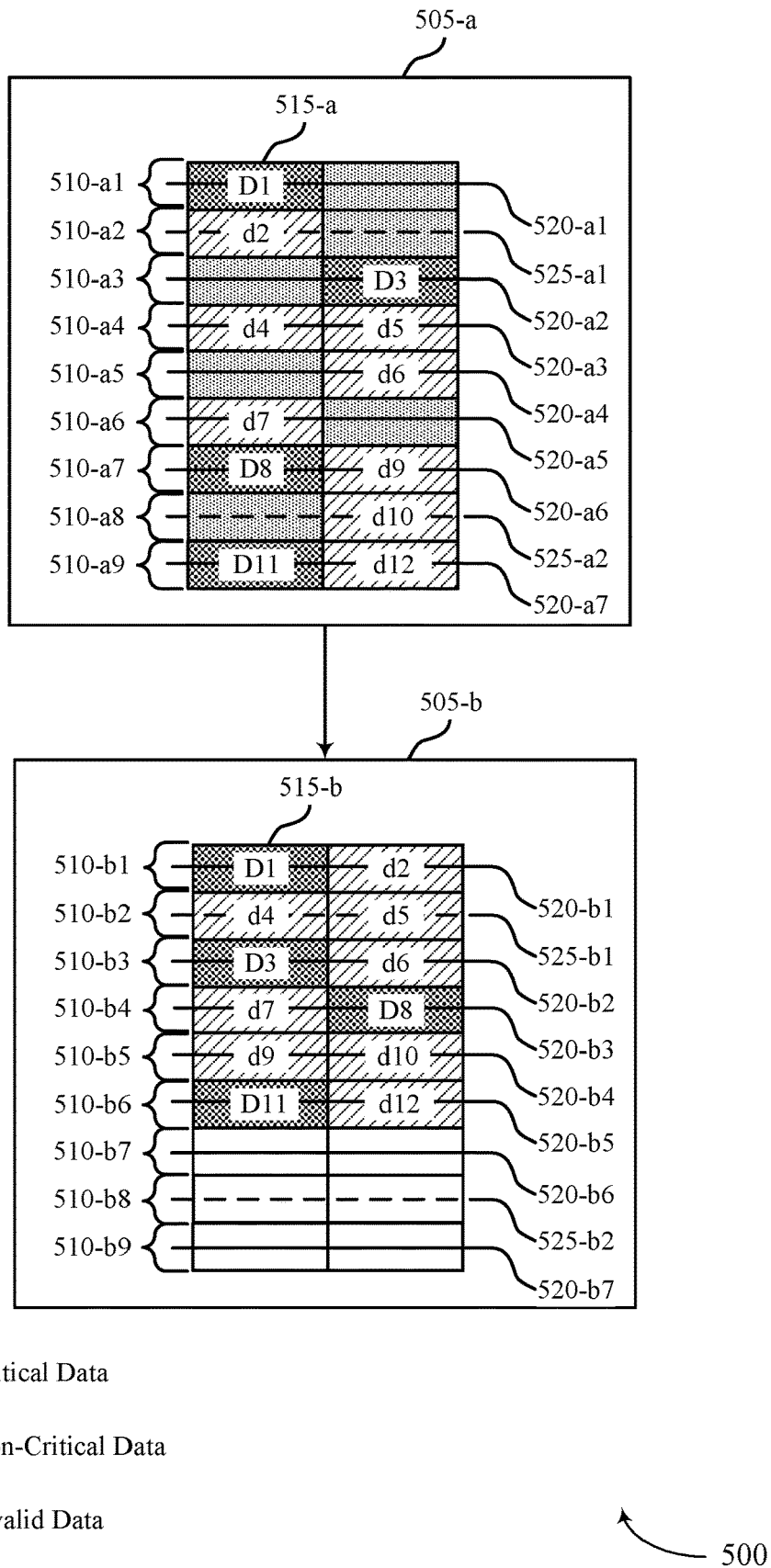

FIG. 5 illustrates an example of a data transfer diagram 500 that supports critical data management within a memory system in accordance with examples as disclosed herein. The data transfer diagram 500 may be implemented by aspects of the system 100 and the memory device 200 described with reference to FIGS. 1 and 2, respectively. For example, the data transfer diagram 500 may be implemented by a memory system or aspects thereof, such as a memory system 110 or a memory device 200 described with reference to FIGS. 1 and 2.

The data transfer diagram 500 may include a block 505-*a* and a block 505-*b*, which may be examples of a block 305-*a* or 405-*a* and a block 305-*b* or 405-*b*, respectively, as described with reference to FIGS. 3 and 4. For example, the blocks 505 may include pages 510, translation units 515

(e.g., translation units 515-*a* of pages 510-*a* and translation units 515-*b* of pages 510-*b*), word lines 520, and weak word lines 525, which may be examples of the corresponding components described with reference to FIGS. 3 and 4. In the example of FIG. 5, the block 505-*a* may include pages 510-*a*1 through 510-*a*9 that are each coupled with a respective word line, and the block 505-*b* may include pages 510-*b*1 through 510-*b*9 that are each coupled with a respective word line (although other quantities of page 510 and word lines in a block 505 are possible). In the example of FIG. 5, the pages 510-*a*1, 510-*a*3 through 510-*a*7, and 510-*a*9 (e.g., the memory cells of these pages 410) may be coupled with word lines 520-*a*1 through 520-*a*7, respectively, and the pages 510-*a*2 and 510-*a*8 may be coupled with weak word lines 525-*a*1 and 525-*a*2, respectively. Additionally, the pages 510-*b*1, 510-*b*3 through 510-*b*7, and 510-*b*9 (e.g., the memory cells of these pages 510) may be coupled with word lines 520-*b*1 through 520-*b*7, respectively, and the pages 510-*b*2 and 510-*b*8 may be coupled with weak word lines 525-*b*1 and 525-*b*2, respectively As described with reference to FIG. 3, a media management operation may include the transfer of valid data from pages 510-*a* of a source block 505-*a* to pages 510-*b* of a destination block 505-*b*, and pages 510 may contain memory cells coupled with word lines 520 and weak word lines 525 (e.g., word lines 520 having a respective bit error rate that satisfies a threshold).

In the example of FIG. 5, as part of a media management operation to transfer data from the source block 505-*a* to the destination block 505-*b*, the memory system may transfer valid data (e.g., both critical data and non-critical data) sequentially as written to the source block 505-*a* while avoiding writing critical data to memory cells coupled with weak word lines 525-*b* of the destination block 505-*b*. For example, in the example of FIG. 5, valid data in the source block 505-*a* may be sequentially ordered (e.g., the data, excluding the invalid data may have been sequentially written to respective translation units 515-*a* of the source block 505-*a*) as data D1, d2, D3, d4, d5, d6, d7, D8, d9, d10, D11, and d12. Accordingly, the memory system may transfer critical data D1 and non-critical data d2 to page 510-*b*1 sequentially (e.g., in accordance with the sequential order). If the memory system encounters a page 510-*b* that contains memory cells coupled with a weak word line 525-*b* (e.g., page 510-*b*2 and weak word line 525-*b*1) the memory system may refrain from writing critical data and may instead write next non-critical data in the sequential order to the page 510-*b*. For example, the memory system may refrain (e.g., delay, skip) writing critical data D3 to page 510-*b*2 to avoid the weak word line 525-*b*1 and may instead continue with writing non-critical data d4 and d5 to the page 510-*b*2 (e.g., based on the data d4 and d5 being the next non-critical data in the sequential order). After the weak word line 525-*b*1 is passed (e.g., has been written to), the memory system may write the skipped critical data (e.g., critical data D3) followed by the next unwritten data in the sequential order (e.g., non-critical data d6) to page 510-*b*3, which may be coupled with the next non-weak word line 520-*b*. The memory system may continue writing the remaining valid data, both critical and non-critical, while avoiding writing critical data to weak word lines 525-*b*, in this way.

Figure 6:
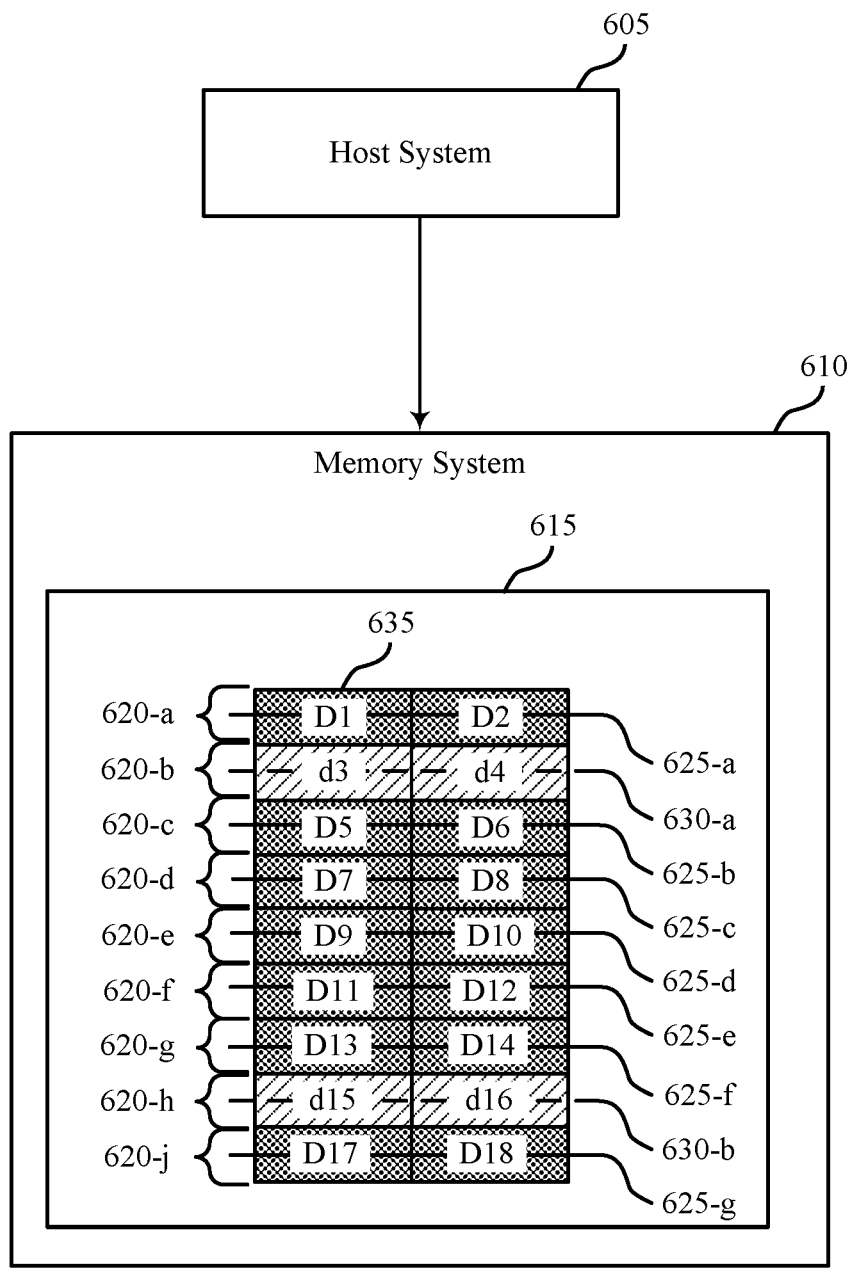
FIG. 6 illustrates an example of a system that supports critical data management within a memory system in accordance with examples as disclosed herein.

FIG. 6 illustrates an example of a system 600 that supports critical data management within a memory system in accordance with examples as disclosed herein. The system 600 may implement or be implemented by aspects of the system 100 described with reference to FIG. 1. For example, the system 600 may include a host system 605 and a memory system 610, which may be examples of the corresponding systems described herein, including with reference to FIGS. 1 through 5.

In the example of FIG. 6, the host system 605 may transmit critical data to be written to the memory system 610. For example, the memory system 610 may receive one or more commands from the host system 605 to write first data (e.g., data D1, D2, D5, D6, D7, D8, D9, D10, D11, D12, D13, D14, D17, and D18) to a block 615 of the memory system 610, which may be an example of a block 305, 405, or 505 described with reference to FIGS. 3 through 5, respectively. For example, the block 615 may include pages 620, translation units 635, word lines 625, and weak word lines 630, which may be examples of the corresponding components described with reference to FIG. 3. In the example of FIG. 6, the block 615 may include pages 620-*a* through 620-*j* that are each coupled with a respective word line (although other quantities of page 620 and word lines in the block 615 are possible). In the example of FIG. 6, the pages 620-*a*, 620-*c* through 620-*g*, and 620-*j* (e.g., the memory cells of these pages 620) may be coupled with word lines 625-*a* through 625-*g*, respectively, and the pages 620-*b* and 620-*h* may be coupled with weak word lines 630-*a* and 630-*b*, respectively.

The first data may be a first type of data (e.g., critical data). In response to the command, the memory system 610 may write the first data to memory cells coupled with non-weak word lines 625 of the block 615, and the memory system 610 may refrain from writing the first data to memory cells coupled with weak word lines 630 of the block 615. In some cases, to avoid writing the first data to memory cells coupled with weak word lines 630, the memory system 610 may write second data, which may be a second type of data (e.g., non-critical data, dummy data, or other data), to the memory cells coupled with the weak word lines 630 instead. For example, as described with reference to FIG. 3, the memory system 610 may write data to the pages 620 sequentially. That is, the memory system 610 may first write data to the page 620-*a*, then to the page 620-*b*, and so on. As such, the word lines of the block 615 may be arranged in an order according to which the data is sequentially written to the block 615 (e.g., the word line 625-*a* coupled with the page 620-*a*, the weak word line 630-*a* coupled with the page 620-*b*, and so on). In response to the one or more commands, the memory system 610 may sequentially write a first subset of the first data (e.g., data D1 and data D2) to a first set of memory cells (e.g., the memory cells of page 620-*a*) coupled with a first subset of word lines 625 (e.g., word line 625-*a*). In some cases, the memory system 610 may determine that the next page 620-*b* of the sequential order contains memory cells coupled with weak word line 630-*a* and may refrain from writing a second (e.g., next) subset of the first data (e.g., critical data) to the page 620-*b*. To avoid writing the first data to the weak word line 630-*a*, while still sequentially writing to the pages 620, the memory system 610 may write the second data (e.g., a subset of the second data: data d3 and d4) to the page 620-*b*.

The memory system 610 may continue writing the remaining first data (e.g., D5 through D18), while avoiding writing the remaining first data to memory cells coupled with other weak word lines 630 of the block 615. For example, the memory system 610 may (e.g., sequentially) write critical data D5 through D14 to the pages 620-*c* through 620-*g* based on the pages 620-*c* through 620-*g* being coupled with non-weak word lines 625. The memory system 610 may determine another page 620-*h* (e.g., a next sequential page 620 after the page 620-g) may contain memory cells coupled with weak word line 630-b. The memory system 610 may again refrain from writing a subset of the first data (e.g., D17 and D18) and may instead write second data (e.g., a subset of the second data: d15 and d16) to page 620-h. The memory system 610 may then continue writing the first data (e.g., D17 and D18) to page 620-j.

In some cases, the memory system 610 may write the second data in response to a program erase count (PEC) associated with the memory system satisfying (e.g., being greater than, being greater than or equal to) a threshold count, as part of an OS download (e.g., storing an update to an OS of the host system 605), or any combination thereof. For example, the PEC satisfying the threshold count may indicate that the memory system 610 is approaching an end of life of the memory system 610, for example, due to the wear associated with performing a large quantity of program and erase operations (e.g., such that the PEC satisfies the threshold count). As such, fewer blocks 615 may be available to support media management operations during which critical data may be written to non-weak word lines, as described herein. Accordingly, fewer media management operations may be performed. Avoiding the initial writing of critical data received from the host system 605 to weak word lines 630 may eliminate the possibility of reading the critical data using weak word lines 630, which may be more likely to occur, for example, if the critical data were to remain in memory cells coupled with weak word lines 630 for a greater period of time due to the reduced frequency at which media management operations are performed.

In some cases, the second type of data may non-critical data associated with the host system, dummy data, data associated with a media management operation (e.g., garbage collection) of the memory system 610, or any combination thereof. For example, a memory system controller of the memory system 610 may include data associated with another ongoing (e.g., concurrent) media management operation, and the memory system 610 may use this data as the second data.

Figure 7:
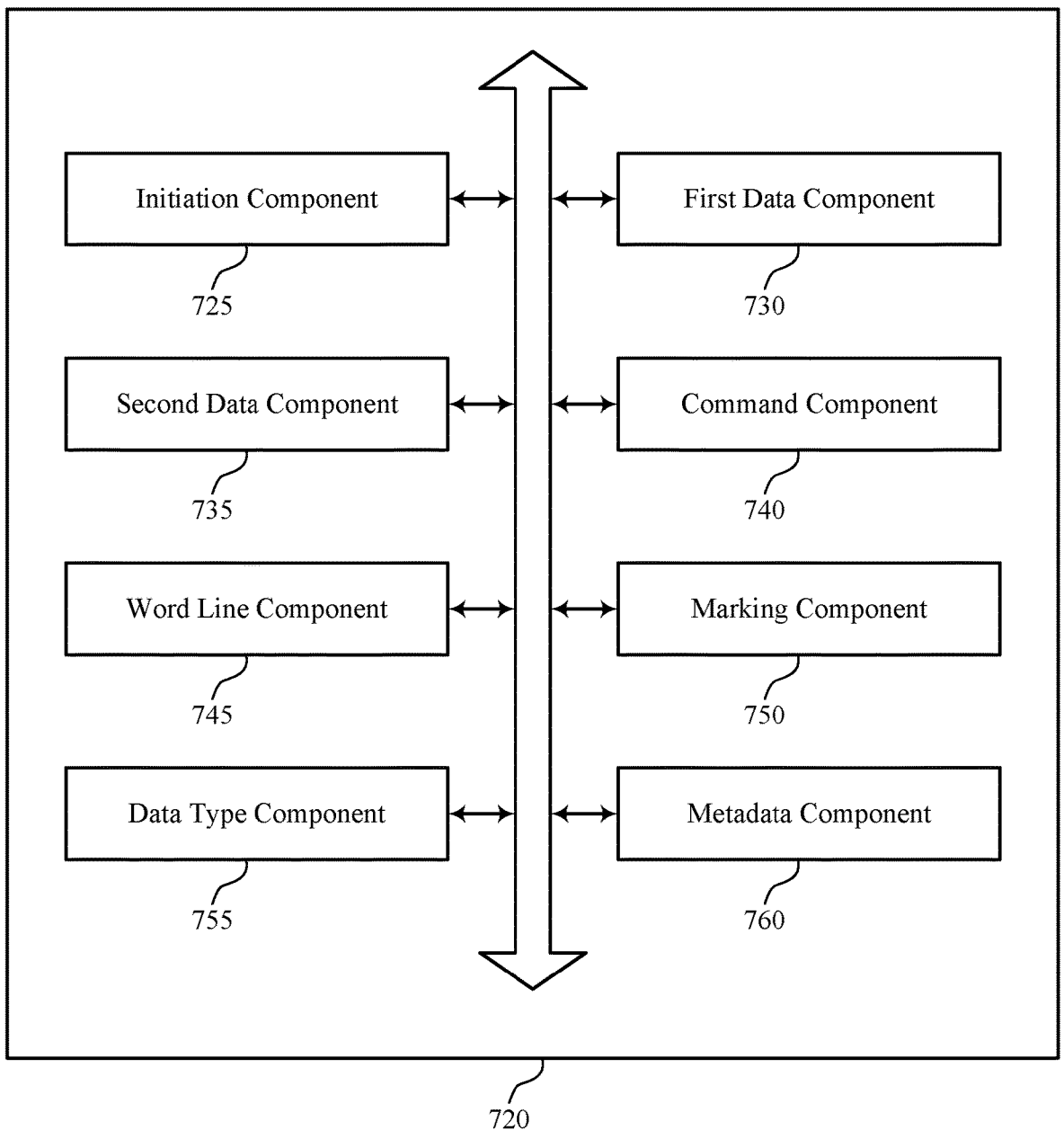
FIG. 7 illustrates a block diagram of a memory system that supports critical data management within a memory system in accordance with examples as disclosed herein.

FIG. 7 illustrates a block diagram 700 of a memory system 720 that supports critical data management within a memory system in accordance with examples as disclosed herein. The memory system 720 may be an example of aspects of a memory system as described with reference to FIGS. 1 through 6. The memory system 720, or various components thereof, may be an example of means for performing various aspects of critical data management within a memory system as described herein. For example, the memory system 720 may include an initiation component 725, a first data component 730, a second data component 735, a command component 740, a word line component 745, a marking component 750, a data type component 755, a metadata component 760, or any combination thereof. Each of these components may communicate, directly or indirectly, with one another (e.g., via one or more buses).

The initiation component 725 may be configured as or otherwise support a means for initiating, by a memory system, a media management operation to transfer first data of a first type and second data of a second type from a first block of the memory system to a second block of the memory system. The first data component 730 may be configured as or otherwise support a means for writing, as part of the media management operation and based at least in part on the first data being of the first type, the first data to a first set of memory cells of the second block coupled with a first set of word lines of the second block, the first set of word lines excluding word lines having a bit error rate that satisfies a threshold. The second data component 735 may be configured as or otherwise support a means for writing, as part of the media management operation and based at least in part on the second data being of the second type, the second data to a second set of memory cells of the second block coupled with a second set of word lines of the second block, the second set of word lines including one or more word lines having the bit error rate that satisfies the threshold.

In some examples, to support writing the first data, the first data component 730 may be configured as or otherwise support a means for writing the first data to the first set of memory cells before writing the second data to the second set of memory cells based at least in part on the first data being of the first type.

In some examples, the first set of word lines and the second set of word lines are included in a third set of word lines of the second block, the third set of word lines arranged in an order according to which data is sequentially written to the second block. In some examples, to support writing the first data, the first data component 730 may be configured as or otherwise support a means for writing a first subset of the first data to a first subset of the first set of memory cells coupled with a first subset of the first set of word lines. In some examples, to support writing the first data, the word line component 745 may be configured as or otherwise support a means for determining whether a word line of the third set of word lines after the first subset of the first set of word lines and before a second subset of the first set of word lines in the order has the bit error rate that satisfies the threshold. In some examples, to support writing the second data, the second data component 735 may be configured as or otherwise support a means for writing, based at least in part on the word line having the bit error rate that satisfies the threshold, a first subset of the second data to a first subset of the second set of memory cells coupled with the word line, where the word line is included in the one or more word lines having the bit error rate that satisfies the threshold.

In some examples, to support writing the first data, the first data component 730 may be configured as or otherwise support a means for writing, after writing the first subset of the second data, a second subset of the first data to a second subset of the first set of memory cells coupled with the second subset of the first set of word lines.

In some examples, to support writing the first data, the first data component 730 may be configured as or otherwise support a means for writing the first data to the first set of memory cells after writing the second data to the second set of memory cells based at least in part on the first data being of the first type.

In some examples, the first data component 730 may be configured as or otherwise support a means for refraining from writing the first data to a subset of second set of memory cells coupled one of the one or more word lines having the bit error rate that satisfies the threshold based at least in part on the first data being of the first type.

In some examples, the marking component 750 may be configured as or otherwise support a means for marking, as a part of the media management operation and before writing the first data, the first data as the first type, where the first data is written to the first set of memory cells coupled with the first set of word lines based at least in part on being marked as the first type.

In some examples, the metadata component 760 may be configured as or otherwise support a means for reading metadata associated with the first data indicating that the first data is of the first type, where the first data is marked as the first type based at least in part on the metadata.

In some examples, the data type component 755 may be configured as or otherwise support a means for determining a set of logical addresses associated with data of the first type. In some examples, the data type component 755 may be configured as or otherwise support a means for determining whether the first data is of the first type based at least in part on the first data having logical addresses included in the set of logical addresses.

In some examples, to support determining the set of logical addresses, the data type component 755 may be configured as or otherwise support a means for tracking which logical addresses are read as part of a bootup procedure, where the set of logical addresses are logical addresses read as part of the bootup procedure.

In some examples, the data type component 755 may be configured as or otherwise support a means for receiving, from a host system coupled with the memory system, an indication that the first data is of the first type.

In some examples, the indication is included in a command to write the first data to the memory system.

In some examples, the first type corresponds to critical data associated with a host system, the critical data including system image data associated with the host system, OS data associated with the host system, data associated with a bootup procedure at the host system, or any combination thereof. In some examples, the second type corresponds to non-critical data associated with the host system.

The command component 740 may be configured as or otherwise support a means for receiving, at a memory system, a first command to write first data of a first type to a block of the memory system. In some examples, the first data component 730 may be configured as or otherwise support a means for writing, based at least in part on the first command, the first data to a first set of memory cells of the block coupled with a first set of word lines of the block, the first set of word lines excluding word lines having a bit error rate that satisfies a threshold. In some examples, the second data component 735 may be configured as or otherwise support a means for writing, based at least in part on the first command, second data of a second type to a second set of memory cells of the block coupled with a second set of word lines of the block, the second set of word lines including one or more word lines having the bit error rate that satisfies the threshold.

In some examples, the first set of word lines and the second set of word lines are included in a third set of word lines of the block, the third set of word lines arranged in an order according to which data is sequentially written to the block. In some examples, to support writing the first data, the first data component 730 may be configured as or otherwise support a means for writing a first subset of the first data to a first subset of the first set of memory cells coupled with a first subset of the first set of word lines. In some examples, to support writing the first data, the word line component 745 may be configured as or otherwise support a means for determining that a word line of the third set of word lines after the first subset of the first set of word lines and before a second subset of the first set of word lines in the order has the bit error rate that satisfies the threshold. In some examples, to support writing the second data, the second data component 735 may be configured as or otherwise support a means for writing, based at least in part on the word line having the bit error rate that satisfies the threshold, a first subset of the second data to a first subset of the second set of memory cells coupled with the word line, where the word line is included in the one or more word lines having the bit error rate that satisfies the threshold.

In some examples, the first data component 730 may be configured as or otherwise support a means for refraining from writing the first data to a subset of second set of memory cells coupled one of the one or more word lines having the bit error rate that satisfies the threshold based at least in part on the first data being of the first type.

In some examples, to support writing the second data to the second set of memory cells, the second data component 735 may be configured as or otherwise support a means for writing the second data to the second set of memory cells based at least in part on a program erase count associated with the memory system satisfying a threshold count.

In some examples, the first type corresponds to critical data associated with a host system, the critical data including system image data associated with the host system, OS data associated with the host system, data associated with a bootup procedure at the host system, or any combination thereof. In some examples, the second type corresponds to non-critical data associated with the host system, dummy data, data associated with a media management operation of the memory system, or any combination thereof.

Figure 8:
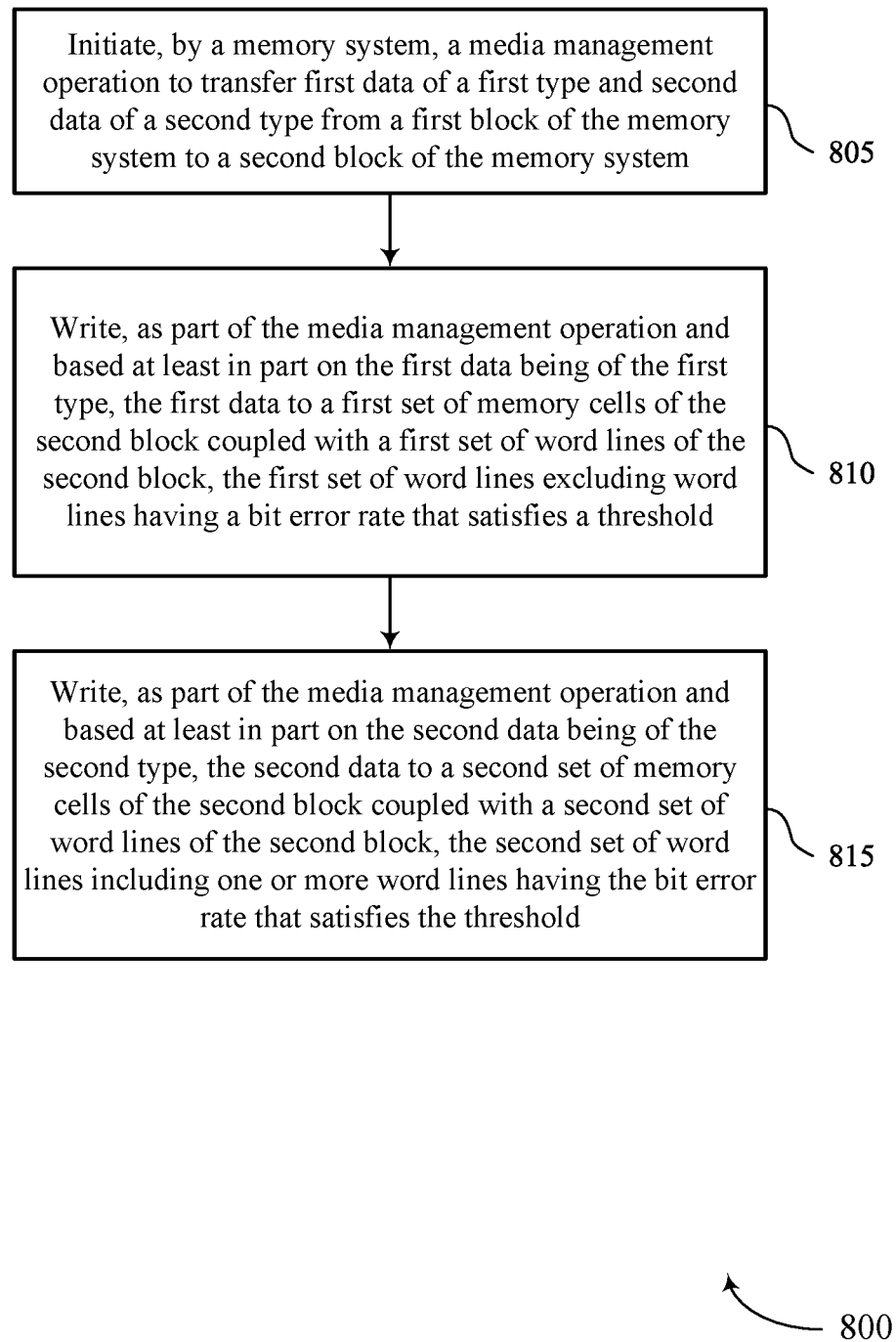
FIGS. 8 and 9 illustrate flowcharts showing a method or methods that support critical data management within a memory system in accordance with examples as disclosed herein.

FIG. 8 illustrates a flowchart showing a method 800 that supports critical data management within a memory system in accordance with examples as disclosed herein. The operations of method 800 may be implemented by a memory system or its components as described herein. For example, the operations of method 800 may be performed by a memory system as described with reference to FIGS. 1 through 7. In some examples, a memory system may execute a set of instructions to control the functional elements of the device to perform the described functions. Additionally, or alternatively, the memory system may perform aspects of the described functions using special-purpose hardware.

At 805, the method may include initiating, by a memory system, a media management operation to transfer first data of a first type and second data of a second type from a first block of the memory system to a second block of the memory system. The operations of 805 may be performed in accordance with examples as disclosed herein. In some examples, aspects of the operations of 805 may be performed by an initiation component 725 as described with reference to FIG. 7.

At 810, the method may include writing, as part of the media management operation and based at least in part on the first data being of the first type, the first data to a first set of memory cells of the second block coupled with a first set of word lines of the second block, the first set of word lines excluding word lines having a bit error rate that satisfies a threshold. The operations of 810 may be performed in accordance with examples as disclosed herein. In some examples, aspects of the operations of 810 may be performed by a first data component 730 as described with reference to FIG. 7.

At 815, the method may include writing, as part of the media management operation and based at least in part on the second data being of the second type, the second data to a second set of memory cells of the second block coupled with a second set of word lines of the second block, the second set of word lines including one or more word lines having the bit error rate that satisfies the threshold. The operations of 815 may be performed in accordance with examples as disclosed herein. In some examples, aspects of the operations of 815 may be performed by a second data component 735 as described with reference to FIG. 7.

In some examples, an apparatus as described herein may perform a method or methods, such as the method 800. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for initiating, by a memory system, a media management operation to transfer first data of a first type and second data of a second type from a first block of the memory system to a second block of the memory system; writing, as part of the media management operation and based at least in part on the first data being of the first type, the first data to a first set of memory cells of the second block coupled with a first set of word lines of the second block, the first set of word lines excluding word lines having a bit error rate that satisfies a threshold; and writing, as part of the media management operation and based at least in part on the second data being of the second type, the second data to a second set of memory cells of the second block coupled with a second set of word lines of the second block, the second set of word lines including one or more word lines having the bit error rate that satisfies the threshold.

Aspect 2: The method, apparatus, or non-transitory computer-readable medium of aspect 1, where writing the first data includes operations, features, circuitry, logic, means, or instructions, or any combination thereof for writing the first data to the first set of memory cells before writing the second data to the second set of memory cells based at least in part on the first data being of the first type.

Aspect 3: The method, apparatus, or non-transitory computer-readable medium of any of aspects 1 through 2, where the first set of word lines and the second set of word lines are included in a third set of word lines of the second block, the third set of word lines arranged in an order according to which data is sequentially written to the second block, and where writing the first data includes operations, features, circuitry, logic, means, or instructions, or any combination thereof for writing a first subset of the first data to a first subset of the first set of memory cells coupled with a first subset of the first set of word lines; determining whether a word line of the third set of word lines after the first subset of the first set of word lines and before a second subset of the first set of word lines in the order has the bit error rate that satisfies the threshold, where writing the second data includes operations, features, circuitry, logic, means, or instructions, or any combination thereof for writing, based at least in part on the word line having the bit error rate that satisfies the threshold, a first subset of the second data to a first subset of the second set of memory cells coupled with the word line, where the word line is included in the one or more word lines having the bit error rate that satisfies the threshold.

Aspect 4: The method, apparatus, or non-transitory computer-readable medium of aspect 3, where writing the first data includes operations, features, circuitry, logic, means, or instructions, or any combination thereof for writing, after writing the first subset of the second data, a second subset of the first data to a second subset of the first set of memory cells coupled with the second subset of the first set of word lines.

Aspect 5: The method, apparatus, or non-transitory computer-readable medium of aspect 1, where writing the first data includes operations, features, circuitry, logic, means, or instructions, or any combination thereof for writing the first data to the first set of memory cells after writing the second data to the second set of memory cells based at least in part on the first data being of the first type.

Aspect 6: The method, apparatus, or non-transitory computer-readable medium of any of aspects 1 through 5, further including operations, features, circuitry, logic, means, or instructions, or any combination thereof for refraining from writing the first data to a subset of second set of memory cells coupled one of the one or more word lines having the bit error rate that satisfies the threshold based at least in part on the first data being of the first type.

Aspect 7: The method, apparatus, or non-transitory computer-readable medium of any of aspects 1 through 6, further including operations, features, circuitry, logic, means, or instructions, or any combination thereof for marking, as a part of the media management operation and before writing the first data, the first data as the first type, where the first data is written to the first set of memory cells coupled with the first set of word lines based at least in part on being marked as the first type.

Aspect 8: The method, apparatus, or non-transitory computer-readable medium of aspect 7, further including operations, features, circuitry, logic, means, or instructions, or any combination thereof for reading metadata associated with the first data indicating that the first data is of the first type, where the first data is marked as the first type based at least in part on the metadata.

Aspect 9: The method, apparatus, or non-transitory computer-readable medium of any of aspects 1 through 8, further including operations, features, circuitry, logic, means, or instructions, or any combination thereof for determining a set of logical addresses associated with data of the first type and determining whether the first data is of the first type based at least in part on the first data having logical addresses included in the set of logical addresses.

Aspect 10: The method, apparatus, or non-transitory computer-readable medium of aspect 9, where determining the set of logical addresses includes operations, features, circuitry, logic, means, or instructions, or any combination thereof for tracking which logical addresses are read as part of a bootup procedure, where the set of logical addresses are logical addresses read as part of the bootup procedure.

Aspect 11: The method, apparatus, or non-transitory computer-readable medium of any of aspects 1 through 10, further including operations, features, circuitry, logic, means, or instructions, or any combination thereof for receiving, from a host system coupled with the memory system, an indication that the first data is of the first type.

Aspect 12: The method, apparatus, or non-transitory computer-readable medium of aspect 11, where the indication is included in a command to write the first data to the memory system.

Aspect 13: The method, apparatus, or non-transitory computer-readable medium of any of aspects 1 through 12, where the first type corresponds to critical data associated with a host system, the critical data including system image data associated with the host system, OS data associated with the host system, data associated with a bootup procedure at the host system, or any combination thereof and the second type corresponds to non-critical data associated with the host system.

Figure 9:
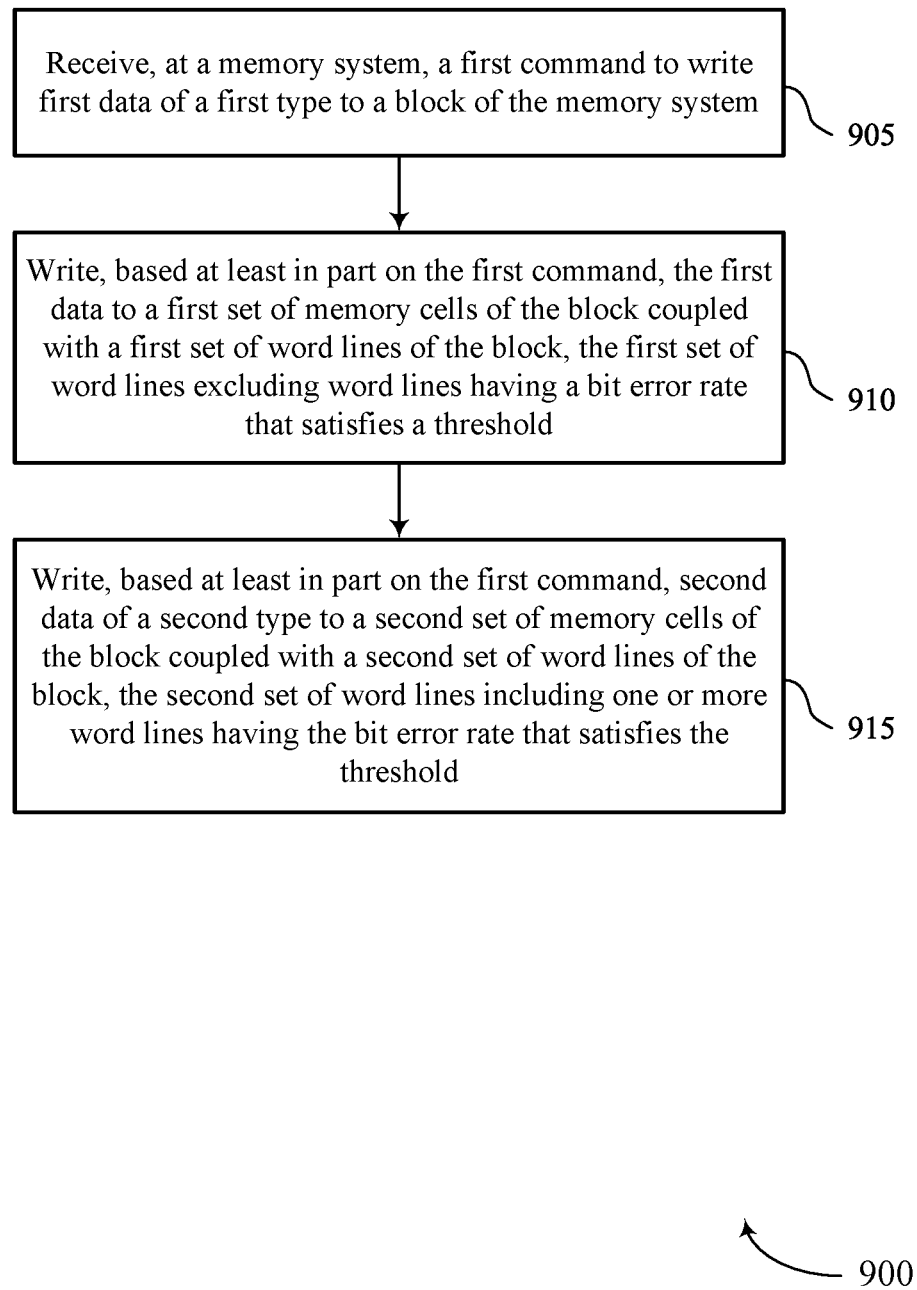

FIG. 9 illustrates a flowchart showing a method 900 that supports critical data management within a memory system in accordance with examples as disclosed herein. The operations of method 900 may be implemented by a memory system or its components as described herein. For example, the operations of method 900 may be performed by a memory system as described with reference to FIGS. 1 through 7. In some examples, a memory system may execute a set of instructions to control the functional elements of the device to perform the described functions. Additionally, or alternatively, the memory system may perform aspects of the described functions using special-purpose hardware.

At 905, the method may include receiving, at a memory system, a first command to write first data of a first type to a block of the memory system. The operations of 905 may be performed in accordance with examples as disclosed herein. In some examples, aspects of the operations of 905 may be performed by a command component 740 as described with reference to FIG. 7.

At 910, the method may include writing, based at least in part on the first command, the first data to a first set of memory cells of the block coupled with a first set of word lines of the block, the first set of word lines excluding word lines having a bit error rate that satisfies a threshold. The operations of 910 may be performed in accordance with examples as disclosed herein. In some examples, aspects of the operations of 910 may be performed by a first data component 730 as described with reference to FIG. 7.

At 915, the method may include writing, based at least in part on the first command, second data of a second type to a second set of memory cells of the block coupled with a second set of word lines of the block, the second set of word lines including one or more word lines having the bit error rate that satisfies the threshold. The operations of 915 may be performed in accordance with examples as disclosed herein. In some examples, aspects of the operations of 915 may be performed by a second data component 735 as described with reference to FIG. 7.

In some examples, an apparatus as described herein may perform a method or methods, such as the method 900. The apparatus may include features, circuitry, logic, means, or instructions (e.g., a non-transitory computer-readable medium storing instructions executable by a processor), or any combination thereof for performing the following aspects of the present disclosure:

Aspect 14: A method, apparatus, or non-transitory computer-readable medium including operations, features, circuitry, logic, means, or instructions, or any combination thereof for receiving, at a memory system, a first command to write first data of a first type to a block of the memory system; writing, based at least in part on the first command, the first data to a first set of memory cells of the block coupled with a first set of word lines of the block, the first set of word lines excluding word lines having a bit error rate that satisfies a threshold; and writing, based at least in part on the first command, second data of a second type to a second set of memory cells of the block coupled with a second set of word lines of the block, the second set of word lines including one or more word lines having the bit error rate that satisfies the threshold.

Aspect 15: The method, apparatus, or non-transitory computer-readable medium of aspect 14, where the first set of word lines and the second set of word lines are included in a third set of word lines of the block, the third set of word lines arranged in an order according to which data is sequentially written to the block, where writing the first data includes operations, features, circuitry, logic, means, or instructions, or any combination thereof for writing a first subset of the first data to a first subset of the first set of memory cells coupled with a first subset of the first set of word lines; determining that a word line of the third set of word lines after the first subset of the first set of word lines and before a second subset of the first set of word lines in the order has the bit error rate that satisfies the threshold, where writing the second data includes; and writing, based at least in part on the word line having the bit error rate that satisfies the threshold, a first subset of the second data to a first subset of the second set of memory cells coupled with the word line, where the word line is included in the one or more word lines having the bit error rate that satisfies the threshold.

Aspect 16: The method, apparatus, or non-transitory computer-readable medium of any of aspects 14 through 15, further including operations, features, circuitry, logic, means, or instructions, or any combination thereof for refraining from writing the first data to a subset of second set of memory cells coupled one of the one or more word lines having the bit error rate that satisfies the threshold based at least in part on the first data being of the first type.

Aspect 17: The method, apparatus, or non-transitory computer-readable medium of any of aspects 14 through 16, where writing the second data to the second set of memory cells includes operations, features, circuitry, logic, means, or instructions, or any combination thereof for writing the second data to the second set of memory cells based at least in part on a program erase count associated with the memory system satisfying a threshold count.

Aspect 18: The method, apparatus, or non-transitory computer-readable medium of any of aspects 14 through 17, where the first type corresponds to critical data associated with a host system, the critical data including system image data associated with the host system, OS data associated with the host system, data associated with a bootup procedure at the host system, or any combination thereof and the second type corresponds to non-critical data associated with the host system, dummy data, data associated with a media management operation of the memory system, or any combination thereof.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" (e.g., "electrically coupling") may refer to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The term "layer" or "level" used herein refers to a stratum or sheet of a geometrical structure (e.g., relative to a substrate). Each layer or level may have three dimensions (e.g., height, width, and depth) and may cover at least a portion of a surface. For example, a layer or level may be a three dimensional structure where two dimensions are greater than a third, e.g., a thin-film. Layers or levels may include different elements, components, and/or materials. In some examples, one layer or level may be composed of two or more sublayers or sublevels.

As used herein, the term "substantially" means that the modified characteristic (e.g., a verb or adjective modified by the term substantially) need not be absolute but is close enough to achieve the advantages of the characteristic.

As used herein, the term "electrode" may refer to an electrical conductor, and in some examples, may be employed as an electrical contact to a memory cell or other component of a memory array. An electrode may include a trace, wire, conductive line, conductive layer, or the like that provides a conductive path between elements or components of a memory array.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally, or alternatively (e.g., in an alternative example), be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
   one or more memory devices; and
   a controller coupled with the one or more memory devices and configured to cause the apparatus to:
   initiate a media management operation to transfer first data of a first type from a first block of a first memory device of the one or more memory devices to a second block of the first memory device and to transfer second data of a second type from the first block of the first memory device to the second block of the first memory device, wherein the first type corresponds to critical data associated with a host system and the second type corresponds to non-critical data associated with the host system;
   write, to transfer the first data as part of the media management operation and based at least in part on the first data being of the first type that corresponds to the critical data, the first data to a first set of memory cells of the second block coupled with a first set of word lines of the second block, the first set of word lines excluding word lines having a bit error rate that satisfies a threshold; and
   write, to transfer the second data as part of the media management operation and based at least in part on the second data being of the second type that corresponds to the non-critical data, the second data to a second set of memory cells of the second block coupled with a second set of word lines of the second block, the second set of word lines comprising one or more word lines having the bit error rate that satisfies the threshold.

2. The apparatus of claim 1, wherein, to write the first data, the controller is configured to cause the apparatus to:
   writing the first data to the first set of memory cells before writing the second data to the second set of memory cells based at least in part on the first data being of the first type.

3. The apparatus of claim 1, wherein the first set of word lines and the second set of word lines are included in a third set of word lines of the second block, the third set of word lines arranged in an order according to which data is sequentially written to the second block, wherein, to write the first data, the controller is configured to cause the apparatus to:
   write a first subset of the first data to a first subset of the first set of memory cells coupled with a first subset of the first set of word lines; and determine whether a word line of the third set of word lines after the first subset of the first set of word lines and before a second subset of the first set of word lines in the order has the bit error rate that satisfies the threshold, wherein, to write the second data, the controller is configured to cause the apparatus to:
write, based at least in part on the word line having the bit error rate that satisfies the threshold, a first subset of the second data to a first subset of the second set of memory cells coupled with the word line, wherein the word line is included in the one or more word lines having the bit error rate that satisfies the threshold.

4. The apparatus of claim 3, wherein, to write the first data, the controller is configured to cause the apparatus to:
write, after writing the first subset of the second data, a second subset of the first data to a second subset of the first set of memory cells coupled with the second subset of the first set of word lines.

5. The apparatus of claim 1, wherein, to write the first data, the controller is configured to cause the apparatus to:
write the first data to the first set of memory cells after writing the second data to the second set of memory cells based at least in part on the first data being of the first type.

6. The apparatus of claim 1, wherein the controller is further configured to cause the apparatus to:
refrain from writing the first data to a subset of second set of memory cells coupled one of the one or more word lines having the bit error rate that satisfies the threshold based at least in part on the first data being of the first type.

7. The apparatus of claim 1, wherein the controller is further configured to cause the apparatus to;
mark, as a part of the media management operation and before writing the first data, the first data as the first type, wherein the first data is written to the first set of memory cells coupled with the first set of word lines based at least in part on being marked as the first type.

8. The apparatus of claim 7, wherein the controller is further configured to cause the apparatus to:
read metadata associated with the first data indicating that the first data is of the first type, wherein the first data is marked as the first type based at least in part on the metadata.

9. The apparatus of claim 1, wherein the controller is further configured to cause the apparatus to:
determine a set of logical addresses associated with data of the first type; and
determine whether the first data is of the first type based at least in part on the first data having logical addresses included in the set of logical addresses.

10. The apparatus of claim 9, wherein, to determine the set of logical addresses, the controller is further configured to cause the apparatus to:
track which logical addresses are read as part of a bootup procedure, wherein the set of logical addresses are logical addresses read as part of the bootup procedure.

11. The apparatus of claim 1, wherein the controller is further configured to cause the apparatus to:
receive, from the host system coupled with the apparatus, an indication that the first data is of the first type.

12. The apparatus of claim 11, wherein the indication is included in a command to write the first data to the apparatus.

13. The apparatus of claim 1, wherein:
the critical data comprises system image data associated with the host system, operating system data associated with the host system, data associated with a bootup procedure at the host system, or any combination thereof.

14. An apparatus, comprising:
one or more memory devices; and
a controller coupled with the one or more memory devices and configured to cause the apparatus to:
receive a first command to write first data of a first type to a block of a memory device of the one or more memory devices, wherein the first type corresponds to critical data associated with a host system;
write, based at least in part on the first command, the first data to a first set of memory cells of the block coupled with a first set of word lines of the block, the first set of word lines excluding word lines having a bit error rate that satisfies a threshold; and
write, based at least in part on the first command, second data of a second type to a second set of memory cells of the block coupled with a second set of word lines of the block, the second set of word lines comprising one or more word lines having the bit error rate that satisfies the threshold, wherein the second type corresponds to non-critical data.

15. The apparatus of claim 14, wherein the first set of word lines and the second set of word lines are included in a third set of word lines of the block, the third set of word lines arranged in an order according to which data is sequentially written to the block, wherein, to write the first data, the controller is further configured to cause the apparatus to:
write a first subset of the first data to a first subset of the first set of memory cells coupled with a first subset of the first set of word lines; and
determine that a word line of the third set of word lines after the first subset of the first set of word lines and before a second subset of the first set of word lines in the order has the bit error rate that satisfies the threshold, wherein, to write the second data, the controller is configured to cause the apparatus to:
write, based at least in part on the word line having the bit error rate that satisfies the threshold, a first subset of the second data to a first subset of the second set of memory cells coupled with the word line, wherein the word line is included in the one or more word lines having the bit error rate that satisfies the threshold.

16. The apparatus of claim 14, wherein the controller is further configured to cause the apparatus to:
refrain from writing the first data to a subset of second set of memory cells coupled one of the one or more word lines having the bit error rate that satisfies the threshold based at least in part on the first data being of the first type.

17. The apparatus of claim 14, wherein, to write the second data to the second set of memory cells, the controller is configured to cause the apparatus to:
write the second data to the second set of memory cells based at least in part on a program erase count associated with the controller satisfying a threshold count.

18. The apparatus of claim 14, wherein
the critical data comprising system image data associated with the host system, operating system data associated with the host system, data associated with a bootup procedure at the host system, or any combination thereof, and the non-critical data corresponds to non-critical data associated with the host system, dummy data, data associated with a media management operation of the controller, or any combination thereof.

19. A non-transitory computer-readable medium storing code comprising instructions which, when executed by a processor of an electronic device, cause the electronic device to:
- initiate, by a memory system, a media management operation to transfer first data of a first type from a first block of a first memory device of the memory system to a second block of the first memory device and second data of a second type from the first block of the first memory device to the second block of the first memory device, wherein the first type corresponds to critical data associated with a host system and the second type corresponds to non-critical data associated with the host system;
- write, to transfer the first data as part of the media management operation and based at least in part on the first data being of the first type that corresponds to the critical data, the first data to a first set of memory cells of the second block coupled with a first set of word lines of the second block, the first set of word lines excluding word lines having a bit error rate that satisfies a threshold; and
- write, to transfer the second data as part of the media management operation and based at least in part on the second data being of the second type that corresponds to the non-critical data, the second data to a second set of memory cells of the second block coupled with a second set of word lines of the second block, the second set of word lines comprising one or more word lines having the bit error rate that satisfies the threshold.

20. The non-transitory computer-readable medium of claim 19, wherein to write the first data, the instructions, when executed by the processor of the electronic device, cause the electronic device to:
- write the first data to the first set of memory cells before writing the second data to the second set of memory cells based at least in part on the first data being of the first type.

* * * * *